(12) United States Patent
Kutsumi et al.

(10) Patent No.: US 9,781,466 B2
(45) Date of Patent: Oct. 3, 2017

(54) BROADCAST IMAGE OUTPUT DEVICE, DOWNLOAD SERVER, AND METHOD OF CONTROLLING BROADCAST IMAGE OUTPUT DEVICE AND DOWNLOAD SERVER

(71) Applicant: Panasonic Intellectual Property Management Co., Ltd., Osaka (JP)

(72) Inventors: Hiroshi Kutsumi, Osaka (JP); Toshiyuki Tanaka, Osaka (JP); Hideo Morita, Osaka (JP); Shunsuke Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/674,232

(22) Filed: Mar. 31, 2015

(65) Prior Publication Data

US 2015/0208115 A1    Jul. 23, 2015

Related U.S. Application Data

(63) Continuation of application No. PCT/JP2014/003744, filed on Jul. 15, 2014.

(30) Foreign Application Priority Data

Aug. 29, 2013   (JP) .................................. 2013-177638

(51) Int. Cl.
*H04N 21/431*   (2011.01)
*H04N 21/462*   (2011.01)
(Continued)

(52) U.S. Cl.
CPC ........... *H04N 21/431* (2013.01); *G06F 13/00* (2013.01); *H04N 5/76* (2013.01); *H04N 5/765* (2013.01);
(Continued)

(58) Field of Classification Search
CPC combination set(s) only.
See application file for complete search history.

(56) References Cited

U.S. PATENT DOCUMENTS 6,990,676 B1 * 1/2006 Proehl ................ H04N 21/6112
725/40
7,412,223 B1   8/2008 Yamamoto et al.
(Continued)

FOREIGN PATENT DOCUMENTS

JP          3825639      9/2006
JP       2009-159367     7/2009
(Continued)

OTHER PUBLICATIONS

International Search Report issued Oct. 21, 2014 in corresponding International Application No. PCT/JP2014/003744.
(Continued)

*Primary Examiner* — Nathan Flynn
*Assistant Examiner* — Christine Kurien
(74) *Attorney, Agent, or Firm* — Wenderoth, Lind & Ponack, L.L.P.

(57) ABSTRACT

A broadcast image output device includes: a reception unit that receives a broadcast; a communication unit that communicates with the download server; an output that outputs each of home screens; a memory unit that holds the home screens; and a control unit that selects one of the home screens and causes the output unit to output the selected home screen as an initial screen to be displayed after power is turned ON. The control unit performs download processing for a new home screen via the communication unit, causes the memory unit to hold home-related information, and causes the output unit to output the new home screen generated based on the home-related information as the initial screen.

9 Claims, 15 Drawing Sheets

(51) Int. Cl.
*H04N 21/81* (2011.01)
*G06F 13/00* (2006.01)
*H04N 5/76* (2006.01)
*H04N 5/765* (2006.01)
*H04N 21/478* (2011.01)
*H04N 21/443* (2011.01)

(52) U.S. Cl.
CPC ..... *H04N 21/4316* (2013.01); *H04N 21/4432* (2013.01); *H04N 21/4438* (2013.01); *H04N 21/4622* (2013.01); *H04N 21/478* (2013.01); *H04N 21/8173* (2013.01)

(56) References Cited

U.S. PATENT DOCUMENTS

| | | | |
|---|---|---|---|
| 2002/0078447 A1 | 6/2002 | Mizutome et al. | |
| 2005/0028208 A1* | 2/2005 | Ellis | H04N 7/163 725/58 |
| 2007/0157281 A1* | 7/2007 | Ellis | H04N 7/17309 725/134 |
| 2009/0172512 A1 | 7/2009 | Sakaguchi et al. | |
| 2010/0030868 A1 | 2/2010 | Okamoto et al. | |
| 2010/0153885 A1* | 6/2010 | Yates | G06F 3/0482 715/841 |
| 2011/0078717 A1* | 3/2011 | Drummond | H04N 21/4586 725/14 |
| 2012/0194734 A1* | 8/2012 | McConville | G06F 17/30846 348/441 |
| 2012/0240143 A1* | 9/2012 | Mathews | H04N 21/252 725/14 |
| 2013/0151934 A1* | 6/2013 | McConville | G06F 17/30846 715/201 |

FOREIGN PATENT DOCUMENTS

| | | |
|---|---|---|
| JP | 2012-114509 | 6/2012 |
| JP | 2012-231196 | 11/2012 |
| WO | 00/70794 | 11/2000 |
| WO | 2008/093780 | 8/2008 |

OTHER PUBLICATIONS

Extended European Search Report issued Jul. 12, 2016 in corresponding European Patent Application No. 14839128.7.
Official Communication issued Mar. 10, 2017 in corresponding European Application No. 14839128.7.

* cited by examiner

BROADCAST IMAGE OUTPUT DEVICE, DOWNLOAD SERVER, AND METHOD OF CONTROLLING BROADCAST IMAGE OUTPUT DEVICE AND DOWNLOAD SERVER

CROSS REFERENCE TO RELATED APPLICATIONS

This is a continuation application of PCT Patent Application No. PCT/JP2014/003744 filed on Jul. 15, 2014, designating the United States of America, which is based on and claims priority of Japanese Patent Application No. 2013-177638 filed on Aug. 29, 2013. The entire disclosures of the above-identified applications, including the specifications, drawings and claims are incorporated herein by reference in their entirety.

TECHNICAL FIELD

The present disclosure relates to a broadcast image output device capable of outputting broadcast images, a download server capable of communicating with the broadcast image output device, and a method of controlling the broadcast image output device and the download server.

BACKGROUND ART

Japanese Patent Publication No. 3825639 discloses a technique of enabling a user to easily customize an image displayed on a display unit of a mobile communication terminal device to serve as an incoming call standby screen or the like. The mobile communication terminal device downloads site screen data from an Information Provider (IP) server and uses the downloaded data as an incoming call standby screen.

SUMMARY OF INVENTION

The present disclosure provides a broadcast image output device and the like which are capable of efficiently downloading a new home screen at a user's request or the like. The new home screen is available as an initial screen, and includes various kinds of information, such as a background image, display position information, and application programs.

According to an aspect of the present disclosure, a broadcast image output device capable of communicating with a download server, the broadcast image output device including: a reception unit configured to receive a broadcast; a communication unit configured to communicate with the download server; an output unit configured to output each of home screens each having a display area divided to sections on each of which one of a first image and at least one second image is capable of being arranged, the first image being a broadcast image relating to the broadcast, and the at least one second image being other than the broadcast image; a memory unit configured to hold the home screens; and a control unit configured to select one of the home screens and cause the output unit to output the selected one of the home screens as an initial screen to be displayed after the broadcast image output device is turned ON, wherein the control unit is configured to (a) perform, via the communication unit, download processing for a new home screen that is a home screen not yet held in the memory unit, (b) cause the memory unit to hold home-related information downloaded from the download server in the download processing to be used to generate at least part of the new home screen, and (c) cause the output unit to output, as the initial screen, the new home screen generated based on the home-related information.

According to another aspect of the present disclosure, a download server capable of communicating with a broadcast image output device, the download server including: a communication unit configured to communicate with the broadcast image output device; a memory unit configured to hold home-related information to be used to generate at least part of a home screen having a display area divided to sections on each of which one of a first image and at least one second image is capable of being arranged, the first image being a broadcast image relating to a broadcast, and the at least one second image being other than the broadcast image; and a control unit configured to transmit the home-related information read from the memory unit to the broadcast image output device via the communication unit.

DESCRIPTION OF EMBODIMENT

The broadcast image output device and the like according to the present disclosure are capable of efficiently downloading a new home screen at a user's request or according to a state of the broadcast image output device, and then easily setting the new home screen as an initial screen.

The following details an embodiment with reference to the drawings. However, too detailed explanation may be omitted. For example, the detailed explanation of a well-known matter or overlapping explanation for a substantially the same structure may be omitted. This is to avoid unnecessarily redundant explanation in the following, and allow those skilled in the art to easily understand.

It should be noted that the inventors provide the appended drawings and the following explanation to allow those skilled in the art to sufficiently understand the present disclosure. However, these are not intended to limit the subject matter recited in Claims. Moreover, the drawings are schematic diagrams and are not necessarily exactly-illustrated drawings.

(Embodiment)

Referring to FIGS. 1 to 17, a broadcast image output device and a download server according to the embodiment will be described.

[1-1. Structure of Broadcast Image Output Device]

Figure 1:
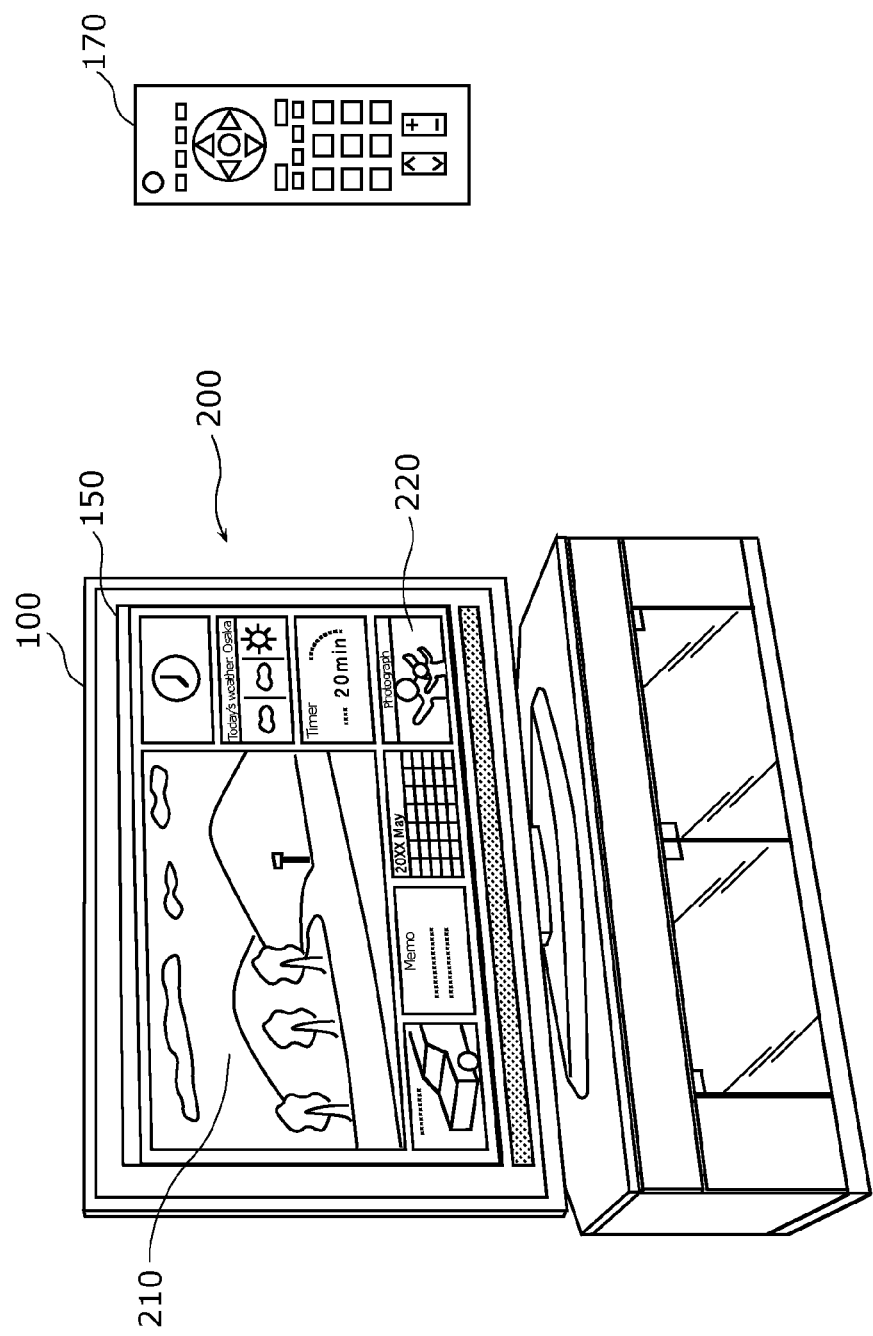
FIG. 1 is an external view of a television and a remote control according to an embodiment.
Figure 2:
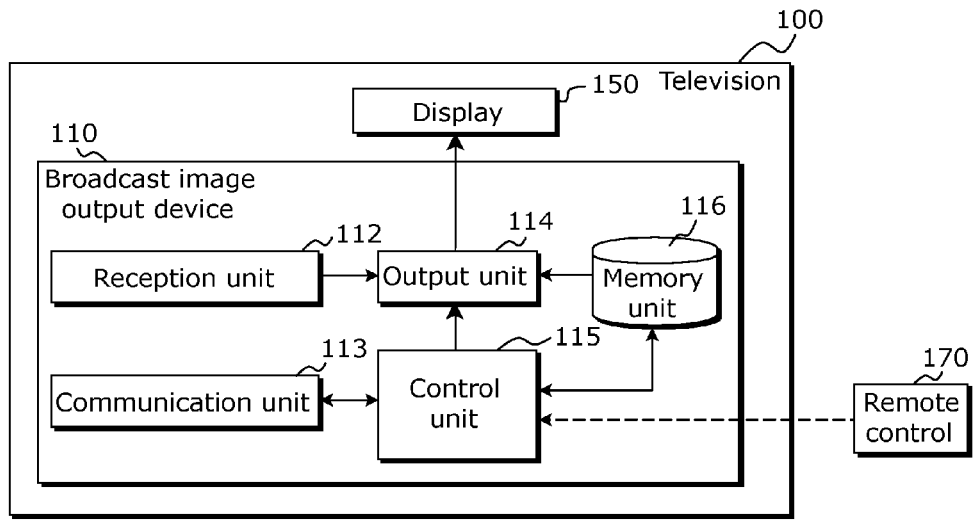
FIG. 2 is a block diagram illustrating a basic functional structure of the television according to the embodiment.

FIG. 1 is an external view of a television 100 and a remote control (or remote controller) 170 according to the present embodiment. FIG. 2 is a block diagram illustrating a basic functional structure of the television 100 according to the present embodiment. As illustrated in FIGS. 1 and 2, the television 100 includes a broadcast image output device 110 and a display 150.

The television 100 can perform operations such as switching channels in accordance with signals from the remote control 170 operated by a user.

Specifically, the remote control 170 has more than one key, and transmits signals indicating instructions according to keys pressed by the user to the television 100 by infrared rays or the like. It should be noted that there is no particular limitation for a method of communicating between the remote control 170 and the television 100. For example, interactive communication between the remote control 170 and the television 100 may be performed by radio communication, such as Bluetooth (a registered trademark).

It should also be noted that the remote control 170 is not limited to such a remote control having more than one key but also a remote control having a pointing device, such as a touch pad. It is also possible that a smartphone with an application program capable of operating the television 100 may be used as the remote control 170.

Other than the functional blocks illustrated in FIG. 2, the television 100 includes structural elements such as a speaker which a television receiver should have. However, to clearly explain the content of the present disclosure, these other structural elements are not illustrated and explained.

As illustrated in FIG. 2, the broadcast image output device 110 includes a reception unit 112, a communication unit 113, an output unit 114, a control unit 115, and a memory unit 116.

The reception unit 112 receives a broadcast via a tuner (not illustrated in FIG. 2) of the television 100. The broadcast is a ground-wave broadcast, a satellite broadcast, a cable broadcast, or an Internet broadcast, for example. It should be noted that the reception unit 112 may function as the tuner.

The communication unit 113 communicates with a download server 300 that will be described later. More specifically, the communication unit 113 is a communication interface for downloading an initial screen and application programs according to instructions from the control unit 115 by communicating with the download server 300. In the present embodiment, a home screen 200 is used as the initial screen.

The output unit 114 can output each of such home screens 200. The outputted home screen 200 is displayed on the display 150.

The control unit 115 selects one of the home screens 200, and causes the output unit 114 to output the selected home screen 200 as an initial screen after the broadcast image output device 110 is powered ON. In the present embodiment, the initial screen is a screen on which user's operations can be received.

The control unit 115 is, for example, a processor such as a Central Processing Unit (CPU). The control unit 115 controls the communication unit 113, the output unit 114, and the memory unit 116 at a user's request via the remote control 170.

Then, the control unit 115 performs download processing for the home screen 200 (in the present embodiment, home screen download processing and app download processing). The download processing will be described in detail later.

The memory unit 116 is a memory in which various pieces of information are stored. It should be noted that the memory unit 116 is not necessarily provided to the broadcast image output device 110. For example, a Hard Disk Drive (HDD) external to the broadcast image output device 110 or a semiconductor memory such as a flash memory may be used as the memory unit 116. Furthermore, a memory, such as a Random Access Memory (RAM), which is inside or external to the broadcast image output device 110 may be used as the memory unit 116.

For example as illustrated in FIG. 1, on each home screen 200, a broadcast image 210 relating to a broadcast received by the reception unit 112 and images other than the broadcast image 210 are arranged to respective sections of a display area.

The home screen 200 is used not only as an initial screen to be displayed when the television 100 is turned ON, but also as a default screen of the television 100 which can be displayed at any desired timing by a user's predetermined operation using the remote control 170.

In the present embodiment, a playback video (moving images) of a broadcast received by the reception unit 112 is displayed on the home screen 200 as the broadcast image 210. Each of the images other than the broadcast image 210 is an application image (app image) 220 in the present embodiment. Here, the broadcast image 210 is an example of the first image in the aspect of the present disclosure, and each of the app images 220 is an example of the second image in the aspect of the present disclosure.

The app image 220 is, for example, an image associated with an application program (hereinafter, referred to also as an "app") executable by the broadcast image output device 110.

That is, the app image 220 may be an image displayed by executing a corresponding app, an icon for executing the app, an icon corresponding to data processed by the app, or an icon corresponding to a predetermined website (web clip icon), for example.

For example, on the home screen 200 illustrated in FIG. 1, one relatively large broadcast image 210 and seven app images 220 are arranged.

It should be noted that the app images 220 and the apps respectively corresponding to these app images 220 are stored in the memory unit 116, for example. Each of the apps is read and executable by the control unit 115. Each of the apps respectively corresponding to the app images 220 arranged on the home screen 200 is expressed also as an "app arranged on the home screen 200", for example.

Moreover, a broadcast app for displaying the broadcast image 210 is also stored in the memory unit 116. Processing such as displaying and size scaling of the broadcast image 210 is performed by the control unit 115 executing the broadcast app.

The memory unit 116 still further holds: screen information of as the home screen 200 that has been downloaded from the download server 300 via the communication unit 113; and apps (including app images 220 corresponding to the respective apps) to be arranged on the downloaded home screen 200.

In the television 100, each of the broadcast image 210 and the app images 220 can be selected by user's operation (operation with the remote control 170 in the present embodiment).

For example, when the broadcast image 210 is selected and a select key on the remote control 170 is pressed, the broadcast image 210 is enlarged and is displayed on the entire display area of the display 150, for example. That is, the broadcast image 210 is displayed on the full screen.

On the other hand, when one of the app images 220 is selected and the select key of the remote control 170 is pressed, an app associated with the selected app image 220 is executed, for example, and an image showing the processing result of the app or the like is displayed on the full screen.

[1-2. Basic Operation of Broadcast Image Output Device]

Figure 3:
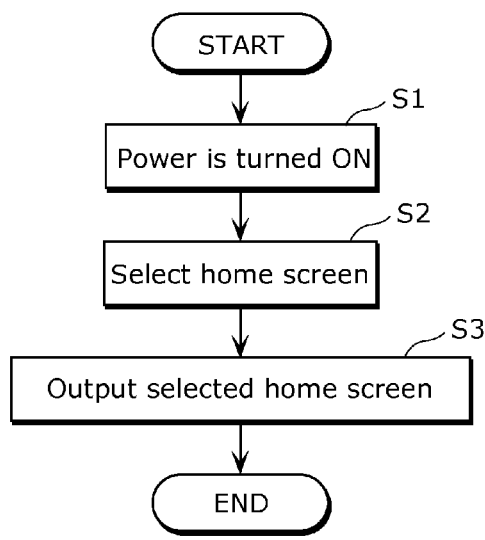
FIG. 3 is a flowchart of basic operation performed by a broadcast image output device when power is turned ON according to the embodiment.

Next, the basic operation performed by the broadcast image output device 110 according to the present embodiment will be described. FIG. 3 is a flowchart of the basic operation performed by the broadcast image output device 110 when power is turned ON according to the present embodiment.

When the broadcast image output device 110 is turned ON (S1), the control unit 115 selects one of the home screens 200 (S2).

Here, pieces of information relating to home screens 200 selectable as an initial screen are previously stored as setting information in the memory unit 116. The control unit 115 selects a home screen 200 with reference to the setting information stored in the memory unit 116.

Under the control of the control unit 115, the output unit 114 outputs the home screen 200 selected by the control unit 115 (S3).

That is, the control unit 115 causes the output unit 114 to output the home screen 200 selected as an initial screen from the plurality of home screens 200 after the power is turned ON. Specifically, the broadcast image output device 110 is turned ON by user's turning ON the television 100, and the home screen 200 selected by the control unit 115 is thereby displayed on the display 150 via the output unit 114.

As described above, the television 100 according to the present embodiment includes the broadcast image output device 110 that outputs each of home screens 200 as an initial screen.

More specifically, when the television 100 is turned ON, one of various different kinds of home screens 200 is displayed as an initial screen.

It should be noted that the "various different kinds of home screens 200" refer to home screens 200 that have different types of images to be displayed, different layouts of the images, the different number of the images, and the like.

[1-3. Home Screen]

Figure 4:
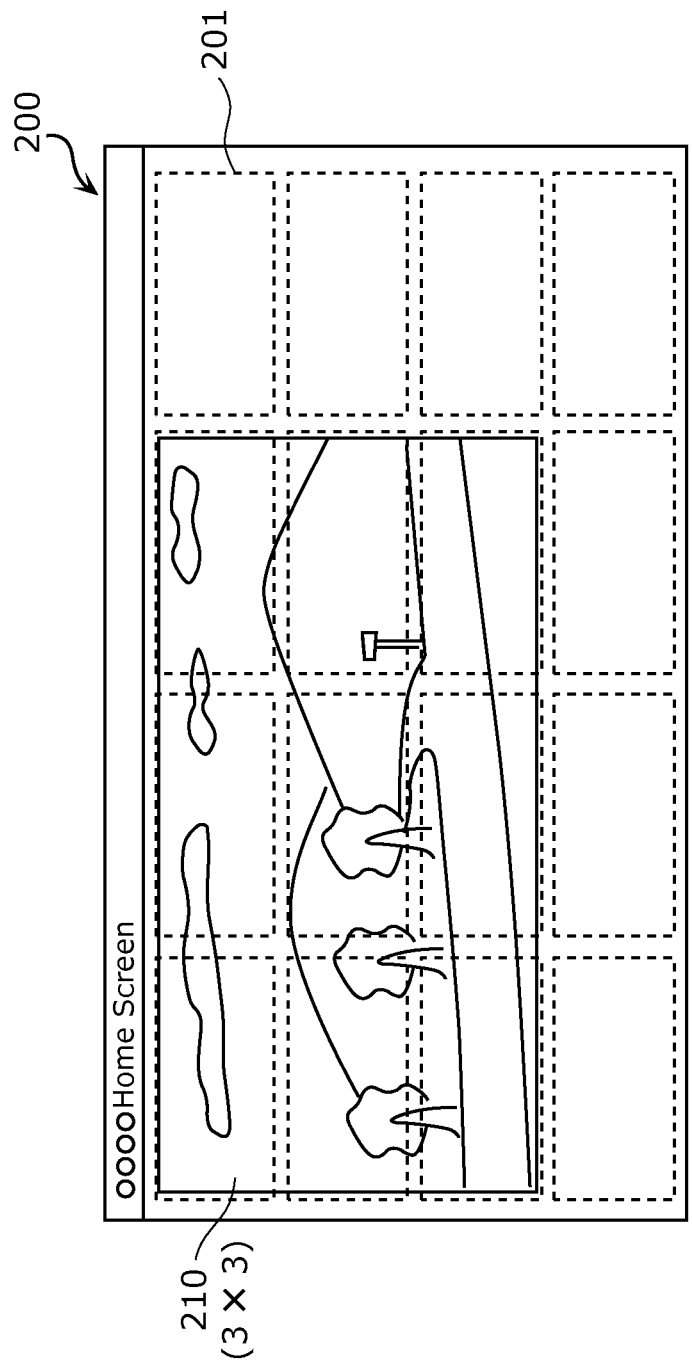
FIG. 4 illustrates an example of a basic structure of a home screen according to the embodiment.
Figure 5:
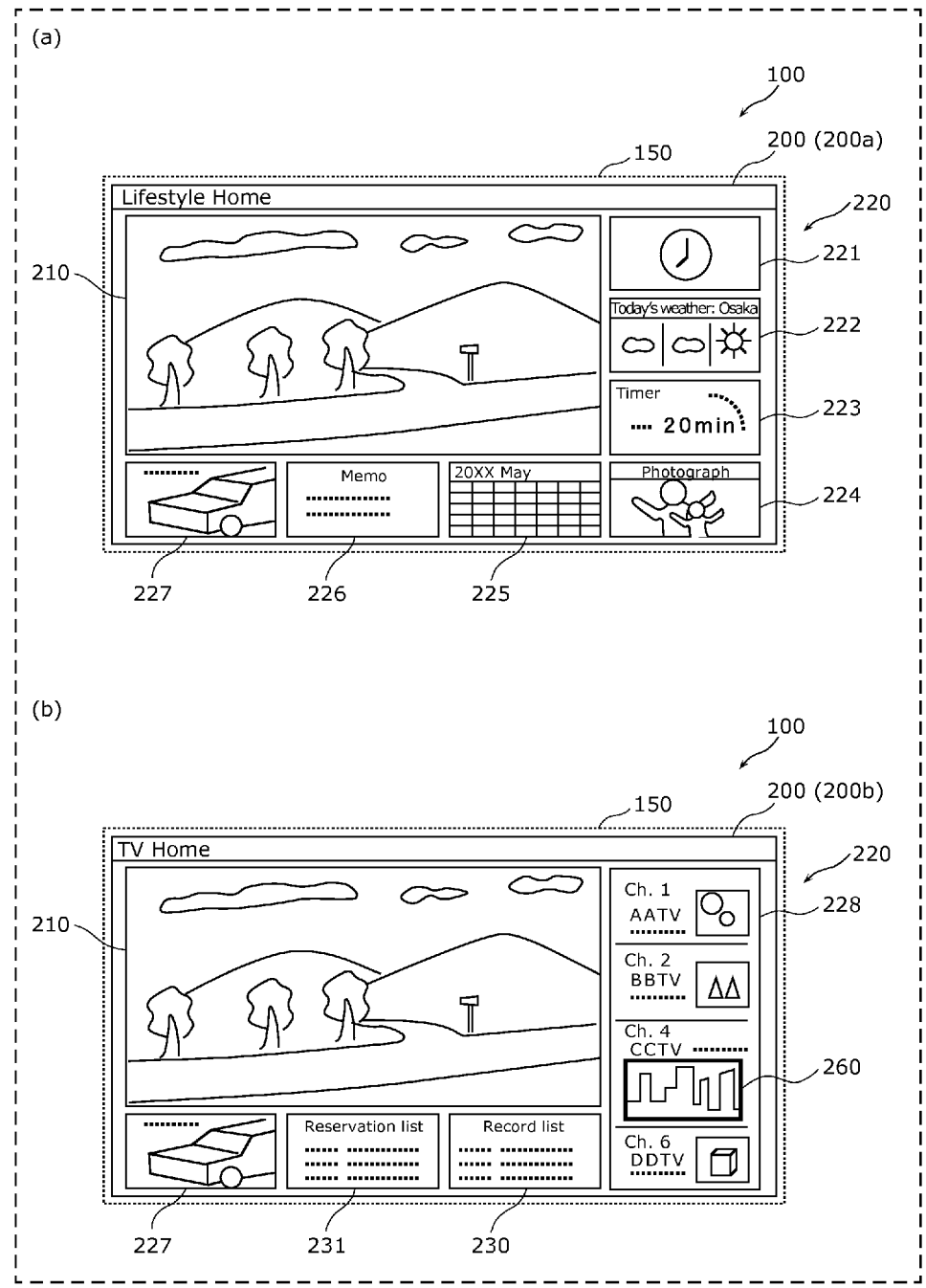
FIG. 5 illustrates two examples of the home screen according to the embodiment.

The following describes the details of the home screens 200 with reference to FIGS. 4 and 5. FIG. 4 illustrates an example of the basic structure of each home screen 200 according to the present embodiment.

In each home screen 200 according to the present embodiment, the display area is divided to sections. For example, as illustrated in FIG. 4, the display area of the home screen 200 is divided to grids (rectangular areas 201) of four columns and four rows (4×4). Each of the broadcast image 210 and the app images 220 is displayed in an area formed of one or more continuous rectangular areas 201.

That is, on the home screen 200, the broadcast image 210 or the app image 220 are capable of being arranged on each section of the display area. For the example illustrated in FIG. 4, the broadcast image 210 is displayed in an area formed of the rectangular areas 201 of three columns and three rows (3×3).

It should be noted that there is an interstice area between adjacent rectangular areas 201 to display a background image. In other words, according to the present embodiment, the display area is divided to the sections (rectangular areas 201) with an interstice area between each adjacent pair of the sections. However, when the displayed broadcast image 210 or the displayed app image 220 spreads across more than one rectangular area 201, the interstice area between adjacent rectangular areas 201 is used for displaying the broadcast image 210 or the app image 220.

It should be noted that the number of the sections, to which the display area of the home screen 200 is divided, is not limited to 4×4. For example, the home screen 200 divided to 8×8 rectangular areas 201 allows the broadcast image 210 and the app images 220 to be scaled with more varieties of sizes.

Information (display position information) indicating allocations of the broadcast image 210 and the app image 220 to the rectangular areas 201 on the home screen 200 is stored in the memory unit 116, for example. Moreover, it is possible to modify the home screen 200 downloaded and stored in the broadcast image output device 110. More specifically, it is possible to update display position information or change app images of the already-downloaded home screen 200. This means that the user can customize the home screen 200. Furthermore, the broadcast image output device 110 according to the present embodiment is capable of storing new home screens 200.

The following describes two examples of such home screen 200 with reference to FIG. 5. It should be noted that the two types of home screens 200 illustrated in FIG. 5 are installed on the broadcast image output device 110 before the television 100 is placed on the market, for example.

(a) in FIG. 5 illustrates the first example of the home screen 200 according to the present embodiment. The home screen 200 illustrated in (a) in FIG. 5 is named, for example, a "lifestyle home", and is hereinafter referred to as a "lifestyle home 200a".

The lifestyle home 200a is a home screen 200 for efficiently providing the user with information necessary for user's everyday life, for example. In the example illustrated in (a) in FIG. 5, a clock 221, a weather forecast 222, a timer 223, a photograph 224, a calendar 225, a memo 226, and an advertisement 227 are displayed as app images 220 in addition to the broadcast image 210 on the lifestyle home 200a.

It should be noted that the number of the app images 220 (second images) arranged on the home screen 200 is not specifically limited. It is also possible to display only one app image 220 on the home screen 200.

The clock 221 is an image of a clock app for displaying time. The weather forecast 222 is an image of a weather forecast app for displaying weather forecast information obtained via the Internet using the communication unit 113, for example.

It should be noted that the "app image" is, as described above, an image obtained by executing an app, or an image associated with the app, such as an icon for executing the app.

The timer 223 is an image of a timer app for starting a timer by a predetermined operation. The photograph 224 is an image of a photograph app for displaying photograph data stored in the memory unit 116 by a predetermined user's operation, for example.

The calendar 225 is an image of a calendar app which can register information of a daily schedule, for example. The memo 226 is an image of a memo app for storing and displaying text information inputted by a predetermined user's operation, for example.

The advertisement 227 is an image of an advertisement app for displaying an advertisement image obtained by the broadcast image output device 110 using the communication unit 113 via the Internet, for example.

Each of these app images 220 is a still image or an image at least a part of which is a moving image.

The clock 221 is, for example, an image including the moving images of a clock generated by the control unit 115 executing the clock app.

(b) in FIG. 5 illustrates the second example of the home screen 200 according to the present embodiment. The home screen 200 illustrated in (b) in FIG. 5 is named, for example, a "TV home", and is hereinafter referred to as a "TV home 200b".

The TV home 200b is a home screen 200 for efficiently providing the user with information of broadcast programs, for example. In the example illustrated in (b) in FIG. 5, a different-channel-program 228, a record list 230, a reservation list 231, and an advertisement 227 are displayed as app images 220 in addition to the broadcast image 210 on the TV home 200b.

The different-channel-program 228 includes imaged of different-channel-program apps for displaying pieces of information of broadcast programs currently on the air other than the broadcast program currently displayed as the broadcast image 210. For example, when a broadcast program on Channel 5 (Ch.5) is currently displayed as the broadcast image 210, pieces of information of broadcast programs on channels other than Ch. 5 (such as broadcast station names, broadcast program names, and still images obtained from moving images of the respective other broadcast programs) are displayed on the different-channel-program 228.

In the above case, the television 100 includes two tuners (first and second tuners). For example, the first tuner receives a broadcast program to be displayed as the broadcast image 210, while the second tuner scans different channels to be displayed on the different-channel-program 228. Thus, pieces of information of broadcast programs on the different channels, such as still images of the broadcast programs, are displayed on the different-channel-program 228.

The record list 230 is an image of a record list app for displaying a list of broadcast programs recorded on a video recorder (not illustrated) connected to the television 100, for example. For example, when the broadcast image output device 110 obtains list information indicating a list of recorded broadcast programs from the video recorder and processes the list information with the record list app, the record list 230 can be obtained.

The reservation list 231 is an image of a reservation list app for displaying a list of broadcast programs scheduled to be recorded by a video recorder (not illustrated) connected to the television 100, for example. For example, when the broadcast image output device 110 obtains reservation information indicating a list of broadcast programs scheduled to be recorded from the video recorder and processes the reservation information with the reservation list app, the reservation list 231 can be obtained.

[1-4. Download Processing for Home Screen]

The following describes download processing for home screen 200 which is performed by the broadcast image output device 110 according to the present embodiment. First, referring to FIGS. 6A to 9, a basic operation of the download processing performed by the broadcast image output device 110 and basic structure and operation of the download server 300 will be described.

Figure 6A:
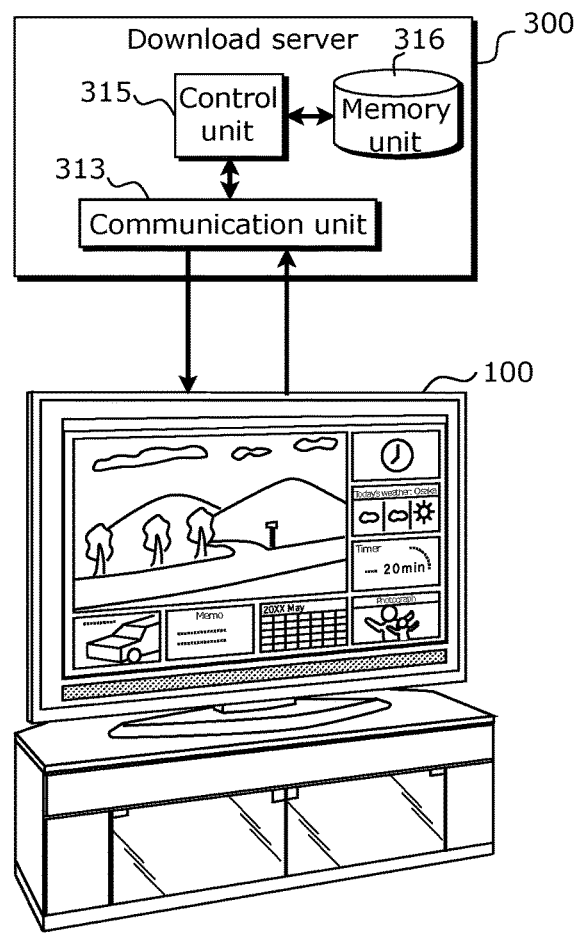
FIG. 6A is a diagram illustrating a relationship between the television and a download server according to the embodiment.
Figure 6B:
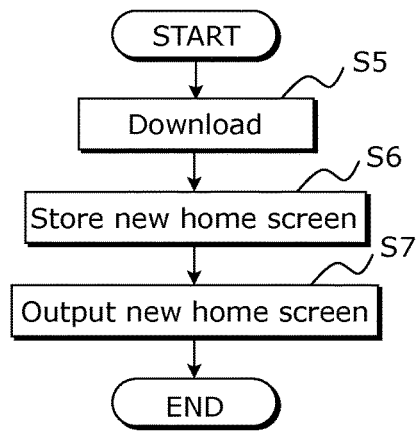
FIG. 6B is a flowchart of a basic operation of the broadcast image output device for adding a new home screen according to the embodiment.

FIG. 6A is a diagram illustrating a relationship between the television 100 and the download server 300 according to the present embodiment. FIG. 6B is a flowchart of the basic processing performed by the broadcast image output device 110 according to the present embodiment for adding a new home screen.

Figure 7:
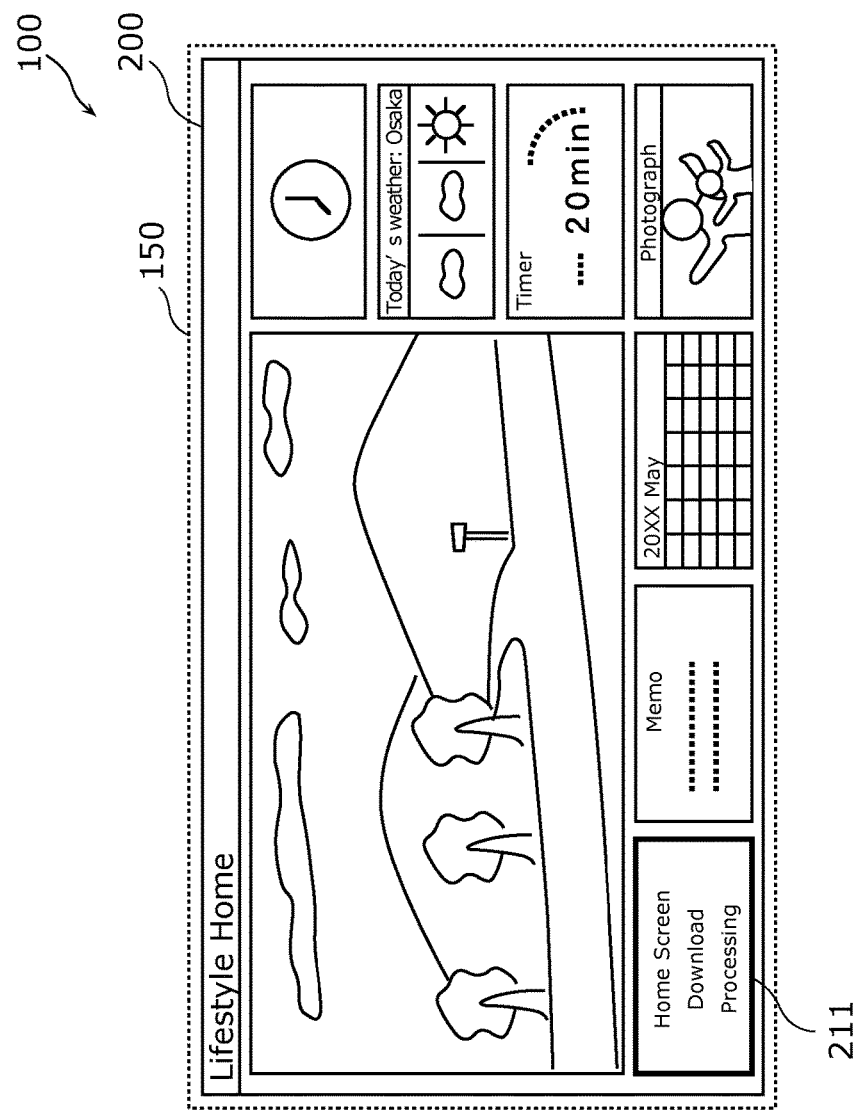
FIG. 7 is a diagram illustrating an example of a home screen having a download function according to the embodiment.
Figure 8:
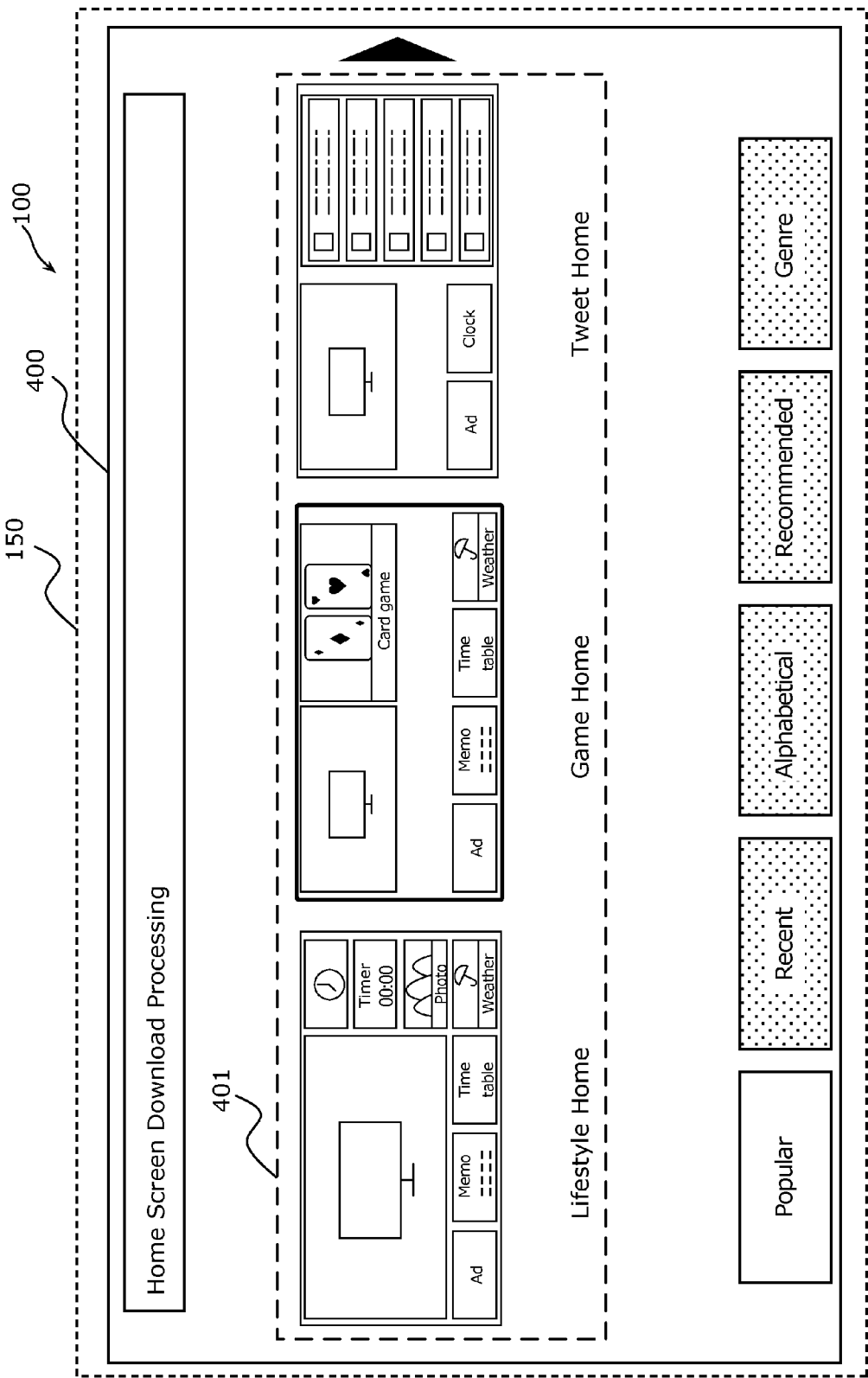
FIG. 8 is a diagram illustrating an example of a screen-adding screen according to the embodiment.
Figure 9:
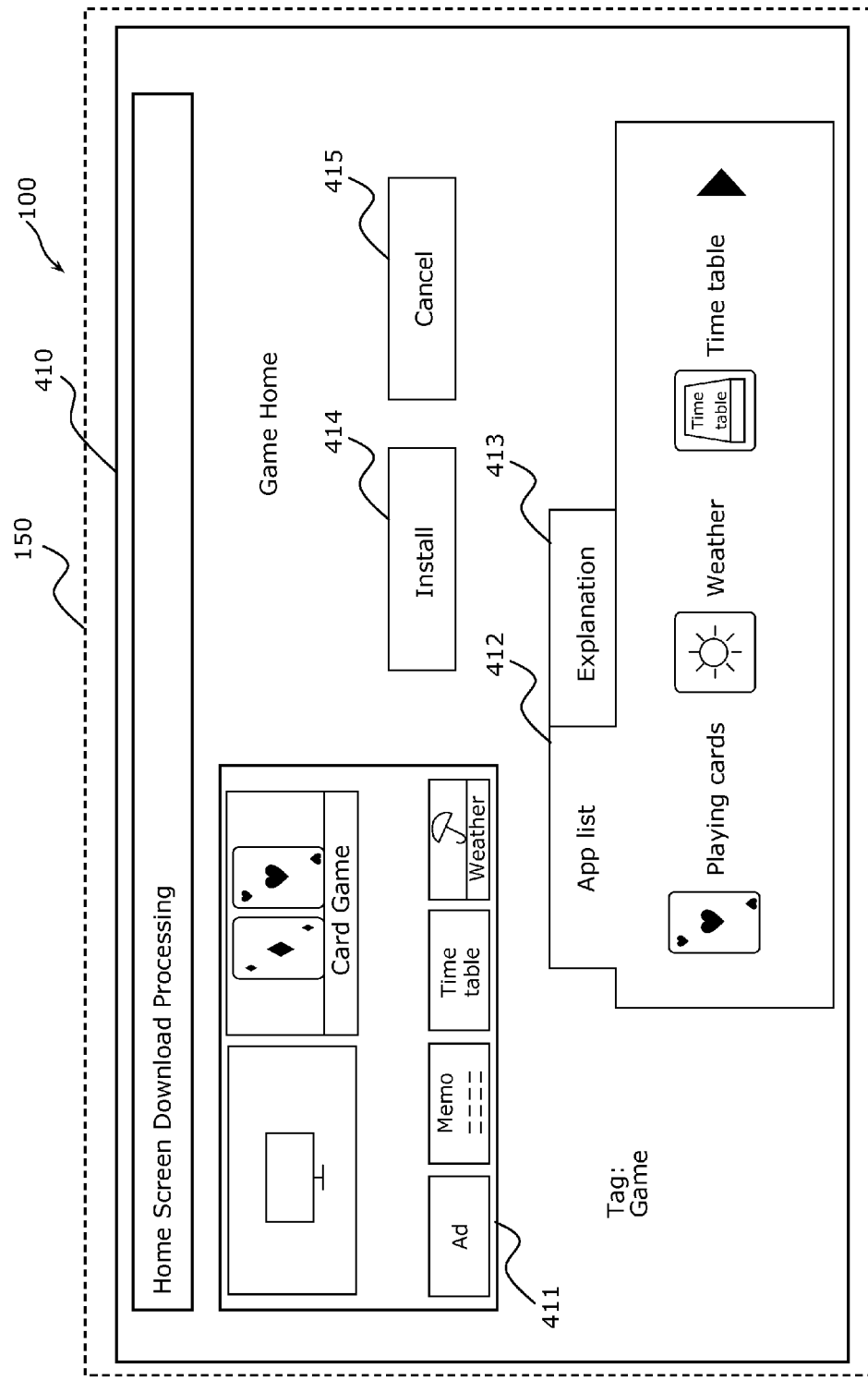
FIG. 9 is a diagram illustrating an example of a download execution screen according to the embodiment.

FIG. 7 is a diagram illustrating an example of the home screen 200 having a download function. FIGS. 8 and 9 are diagrams illustrating an example of screen changing in download processing for the home screen 200. More specifically, FIG. 8 is a diagram illustrating an example of a screen-adding screen 400, and FIG. 9 is a diagram illustrating an example of a download execution screen 410.

The broadcast image output device 110 is, as previously described, capable of selectively switching the plurality of home screens 200 stored in memory unit 116 and displaying the selected home screen as an initial screen. The broadcast image output device 110 is further capable of newly storing another home screen 200 which has not yet been stored in the broadcast image output device 110 (hereinafter, referred to also as a "new home screen") to the memory unit 116, and using the newly stored home screen 200 as an initial screen.

In this case, as illustrated in FIG. 6A, the television 100 communicates on the Internet with the download server 300 holding a new home screen so as to add the new home screen into the memory unit 116.

More specifically, the broadcast image output device 110 performs the processing in FIG. 6B to add a new home screen.

The broadcast image output device 110 communicates the download server 300 and thereby performs download processing for a new home screen (S5).

Then, the broadcast image output device 110 stores, into the memory unit 116, home-related information which is actually downloaded from the download server 300 in the download processing (S6). The home-related information is used to generate at least a part of the new home screen. In other words, in short, the downloaded new home screen is stored into the memory unit 116.

Then, the broadcast image output device 110 causes the output unit 114 to output the new home screen generated according to the home-related information as an initial screen (S7).

If a home screen 200 (for example, lifestyle home screen 200*a*) in the broadcast image output device 110 is customized, for example, if an app on the lifestyle home screen 200*a* is changed in the broadcast image output device 110, an default lifestyle home screen 200*a* downloaded after the customizing is treated as a new home screen.

According to the present embodiment, the download server 300 is capable of providing the broadcast image output device 110 with a plurality of home screens 200 as new home screens. The download server 300 includes a communication unit 313, a memory unit 316, and a control unit 315. The communication unit 313 is capable of communicating with the broadcast image output device 110.

The memory unit 316 holds home-related information to be used to generate at least a part of a home screen 200. The control unit 315 transmits the home-related information read from the memory unit 316 to the broadcast image output device 110 via the communication unit 313. The broadcast image output device 110 is capable of outputting, as an initial screen, a new home screen generated according to the home-related information received from the download server 300.

The home-related information indicates, for example, various pieces information including app images 220 to be arranged on the corresponding new home screen, display position information of the app images 220, apps corresponding to the app images 220, and the like.

In order to download the new home screen, the user, in practice, operates an app for home screen download processing which is arranged on the home screen 200 illustrated in FIG. 7. As a result, each of the screens of FIGS. 8 and 9 is displayed on the television 100, and the broadcast image output device 110 executes download processing for the new home screen requested by the user.

More specifically, by operating the remote control 170 or the like, the user selects on the home screen 200 a home screen download processing 211 that is an app image 220 corresponding to a home-screen-download-processing app illustrated in FIG. 7, and then presses a decision key. As a result, the home-screen-download-processing app is executed. The execution of the home-screen-download-processing app displays the screen-adding screen 400 illustrated in FIG. 8 on the display 150.

The screen-adding screen 400 has candidate region 401 in which a snapshot and a name of each of a plurality of new home screens addable to the memory unit 116 are displayed. By operating the remote control 170 or the like, the user horizontally scrolls the candidate region 401 of the screen-adding screen 400 to sequentially display the plurality of addable new home screens.

In the example illustrated in FIG. 8, a "game home" displayed on the screen-adding screen 400 is focused and selected by the user using the remote control 170 or the like. As a result, as illustrated in FIG. 9, a download execution screen 410 for the "game home" is displayed.

The download execution screen 410 in FIG. 9 includes: a snapshot 411 displaying a screen image of the new home screen selected on the screen-adding screen 400 in FIG. 8; a list tab 412; an explanation tab 413; an install button 414; and the like.

The list tab 412 displays names and the like of apps to be arranged on a new home screen (hereinafter, "game home" in the example). The explanation tab 413 displays features, details, and the like of the new home screen. The install button 414 is used to start downloading of the new home screen to the broadcast image output device 110.

When the user presses the install button 414, (a) screen information including the display position information and the like regarding the new home screen, and (b) apps to be arranged on the new home screen are downloaded to the memory unit 116 of the broadcast image output device 110 at the same time or at respective different times requested by the user. Here, if the above downloading is not necessary, the user may press a cancel button 415 to return to the screen-adding screen 400 in FIG. 8 or the home screen 200 in FIG. 7.

It should be noted that the various pieces of information arranged on the screen-adding screen 400 in FIG. 8 and the download execution screen 410 in FIG. 9 are stored in the download server 300, for example, in the memory unit 316 of the download server 300. At a request from the broadcast image output device 110, the download server 300 transmits the various pieces of information to be arranged on the screen-adding screen 400 or the like to the broadcast image output device 110. As a result, the television 100 displays the screen-adding screen 400 or the like.

[1-4-1. Home Screen Download Processing]

As described above, by operations on the download execution screen 410 illustrated in FIG. 9, the broadcast image output device 110 performs download processing for a new home screen. The download processing according to the present embodiment includes download processing for a home screen (home screen download processing) and download processing for apps (app download processing).

The home screen download processing is an example of the first download processing in the aspect of the present disclosure, and is used to download screen information of a new home screen. The screen information is home-related information of the new home screen. In other words, the home screen download processing is used to download pieces of information relating to displaying of the new home screen.

The app download processing is an example of the second download processing in the aspect of the present disclosure, and is used to download apps corresponding to the new home screen (in other words, apps corresponding to respective app images 220 to be arranged on the new home screen). The apps are the home-related information of the new home screen. In other words, the app download processing is used to download pieces of information relating to functions of the new home screen.

The home screen download processing and app download processing are performed at the same time or at respective different times requested by the user.

First, the home screen download processing is described with reference to a communication sequence of FIG. 10.

Figure 10:
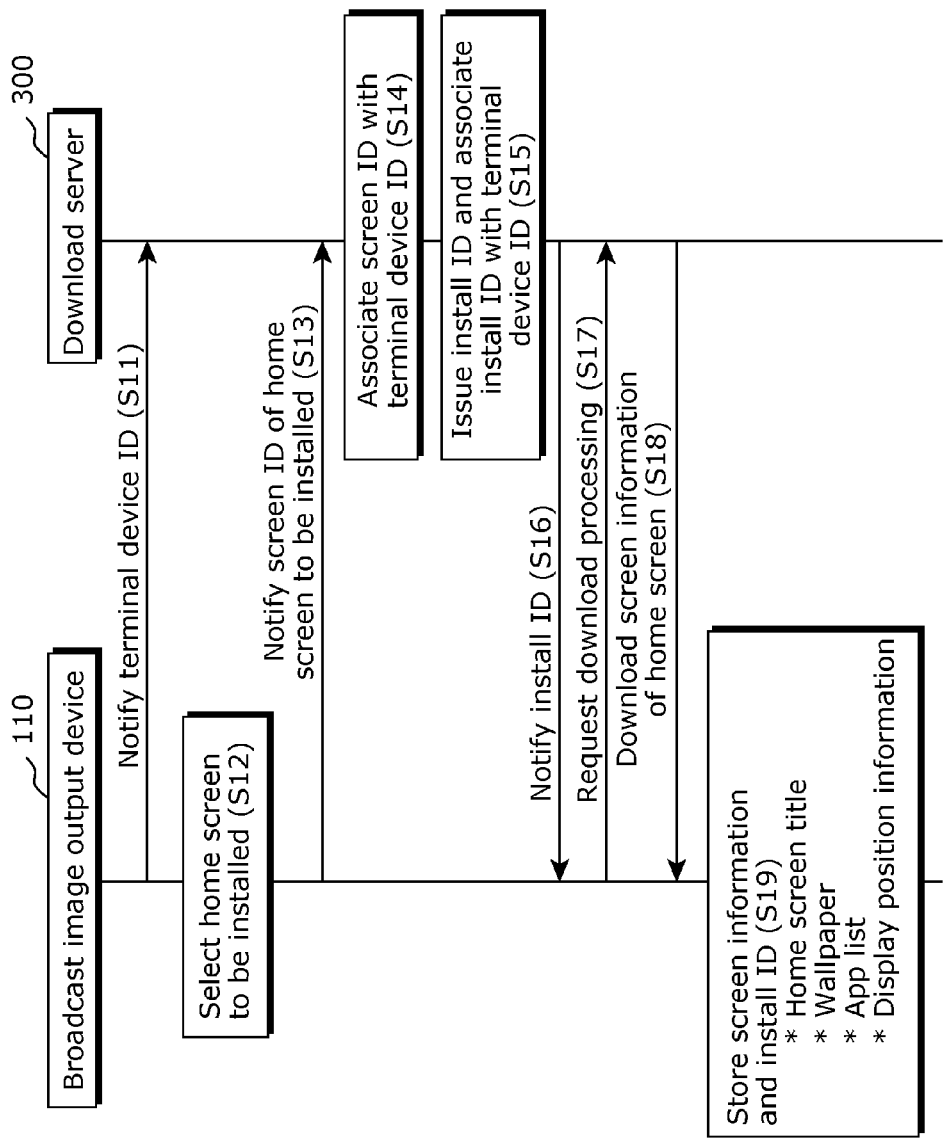
FIG. 10 illustrates an example of a communication sequence in home screen download processing according to the embodiment.

FIG. 10 illustrates an example of a communication sequence in the home screen download processing according to the present embodiment.

More specifically, FIG. 10 illustrates an example of a communication sequence in the case where the broadcast image output device 110 and the download server 300 communicate with each other to download screen information of a new home screen to the memory unit 116. The screen information of the new home screen is described later with reference to FIG. 12.

The broadcast image output device 110 is connected to the Internet to communicate with the download server 300 on the Internet, and notifies the download server 300 of a terminal device identifier (terminal device ID) stored in the memory unit 116 of the broadcast image output device 110 (S11).

The notification of the terminal device ID allows the download server 300 to identify the broadcast image output device 110 connected to the download server 300, and thereby treats the broadcast mage output device 110 as a partner in the following communication sequence.

After the notification of the terminal device ID, the user selects the home screen download processing 211 (refer to FIG. 7) on the home screen 200 and presses the decision key to execute an app for home screen download processing (hereinafter, referred to as a "home-screen-download-processing app"). Then, the user selects a desired one of home screens 200 on the screen-adding screen 400, and presses the install button 414 on the download execution screen 410 which is displayed after selecting the home screen 200. As a result, downloading of the user's desired new home screen starts (S12).

Each home screen 200 is assigned with a screen identifier (screen ID). When the user presses the install button 414, the broadcast image output device 110 notifies the download server 300 of the screen ID of the new home screen to be downloaded (S13).

The screen ID is an example of the home identifier in the aspect of the present disclosure, and uniquely identifies information (home-related information) of a corresponding home screen 200 among pieces of information of home screens 200 which are stored in the download server 300.

The download server 300 associates the screen ID receives at S13 to the terminal device ID received at S11 so as to manage which home screen 200 the broadcast image output device 110 has already downloaded (S14).

Furthermore, when the download server 300 causes the broadcast image output device 110 to download the home screen 200 (new home screen), the download server 300 issues an install identifier (install ID) associated with the new home screen. Then, the download server 300 associates the issued install ID to the terminal device ID received at S11 (S15).

Although a plurality of issued install IDs each associated with one terminal device ID have respective unique values, it is also possible to issue an install ID unique to each of home screens 200 downloaded from the download server 300.

Here, an ID list (management table) managed in the download server 300 is described with reference to FIG. 11.

Figure 11:
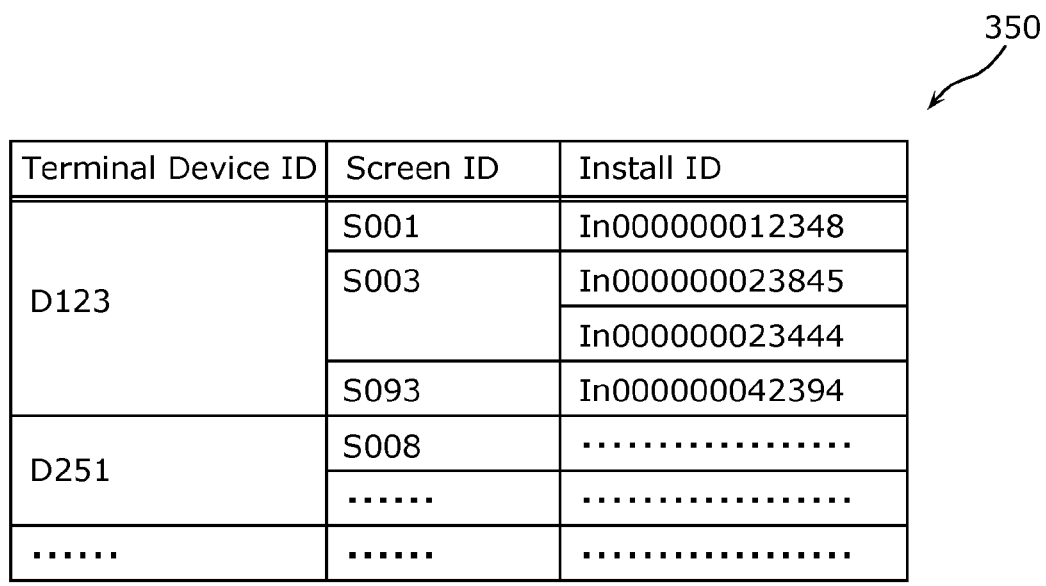
FIG. 11 illustrates an example of a data structure of a management table stored in the download server according to the embodiment.

FIG. 11 illustrates an example of a data structure of a management table 350 stored in the download server 300 according to the present embodiment.

The download server 300 causes a memory unit (not illustrated) in the download server 300 to hold the management table 350 as illustrated in FIG. 11, for example.

The management table 350 holds terminal devices ID for identifying respective broadcast image output devices 110, screen IDs for identifying respective home screens 200, and install IDs of respective home screens 200 each of which is actually downloaded to a corresponding one of the broadcast image output devices 110, so as to manage association relationships among these IDs.

Furthermore, in the management table 350, a combination of a screen ID and an install ID is registered for each of the broadcast image output devices 110.

Therefore, the download server 300 can detect which home screen 200 has already been downloaded to which broadcast image output device 110 according to which install ID.

Here, in the management table 350 seen in FIG. 11, two install IDs "In000000023845" and "In000000023444" are associated with a home screen 200 having a screen ID "S003". This means that two home screens 200 having the same screen ID "S003" (home screens S003) are actually installed on the broadcast image output device 110 having a terminal device ID "D123".

For example, there is a situation where the home screen S003 is installed to the broadcast image output device 110 and customized, and then the default home screen S003 in the download server 300 is installed again to the broadcast image output device 110. In such a situation, as described above, different install IDs are issued for the same screen ID.

After S15, the download server 300 notifies the issued install ID to the broadcast image output device 110 (S16). The broadcast image output device 110 issues, to the download server 300, a download request including the notified install ID for requesting screen information of a home screen 200 (new home screen) associated to the notified install ID (S17).

When receiving the download request, the download server 300 transmits, to the broadcast image output device 110, the screen information of the home screen 200 (new home screen) associated to the screen ID included in the download request (S18). The screen information downloaded to the broadcast image output device 110 is stored to the memory unit 116 of the broadcast image output device 110 in association with the install ID (S19).

The screen information of the new home screen which is to be downloaded to the broadcast image output device 110 includes at least one of: a background image of the new home screen; one or more identifiers (app IDs) of apps corresponding to respective app images 220 arranged on the new home screen: and display position information of the app images 220.

According to the present embodiment, the screen information includes: a title of the home screen 200; a wallpaper (background image); a list (application list) of one or more app IDs of respective apps arranged on the home screen 200; and display position information indicating an arrangement of the apps (app images 220) on the home screen 200.

Figure 12:
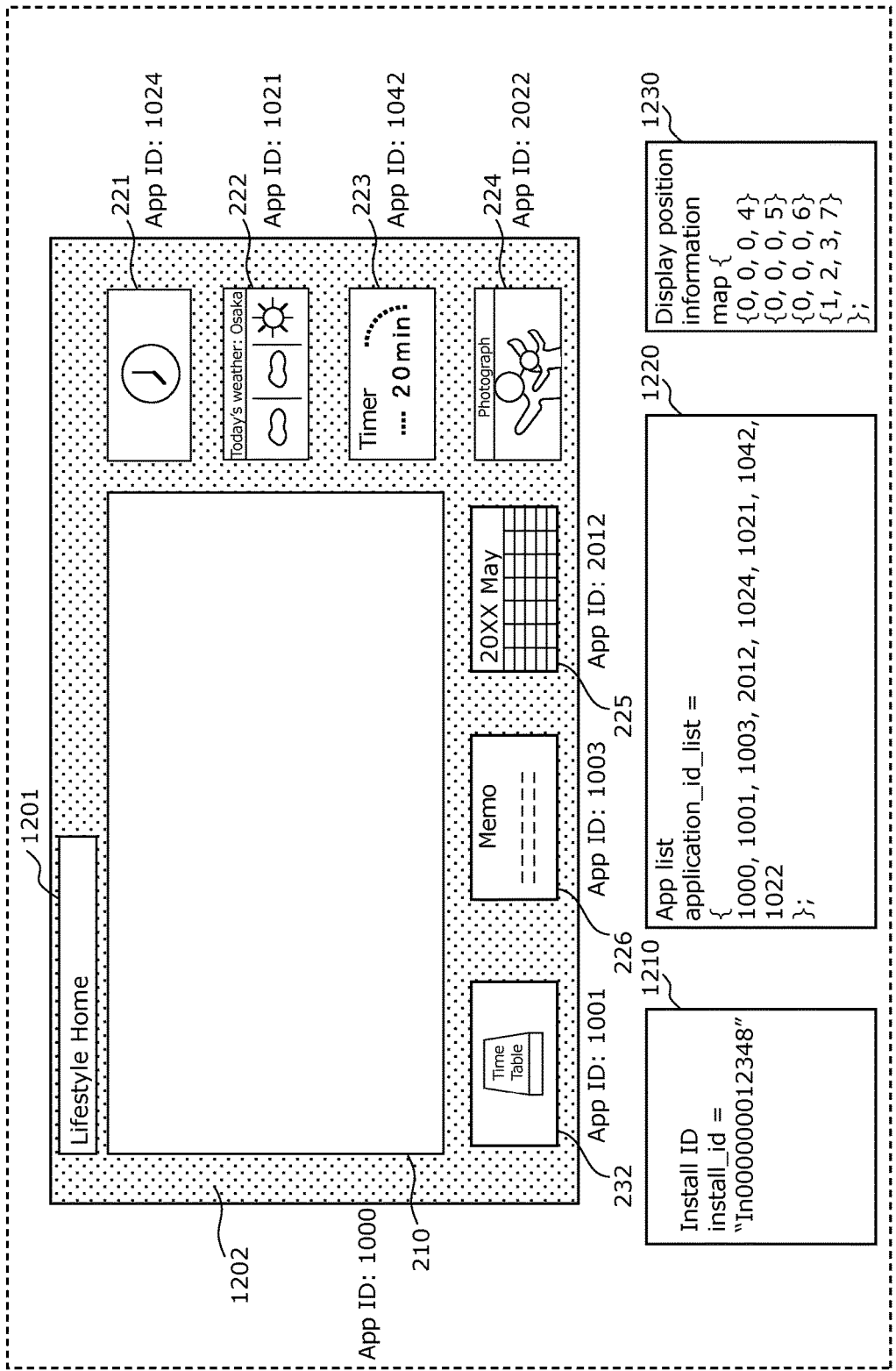
FIG. 12 illustrates an example of a data structure of a screen information and an example of a home screen generated according to the screen information, according to the embodiment.

FIG. 12 illustrates an example of a data structure of the screen information and an example of a home screen 200 generated according to the screen information according to the present embodiment. In other words, in FIG. 12, the screen information, the home screen 200, and the install ID are related to each other.

A title 1201 is information indicating a title of the home screen 200. The title 1201 is downloaded as text data. A background image 1202 is an image used as a wallpaper of the home screen 200. The background image 1202 is downloaded as JPEG image data, for example. An install ID 1210 is identification information for identifying the home screen 200 to be downloaded.

The home screen 200 is characterized by displaying a plurality of apps. A list of app IDs for identifying these apps are downloaded so as an application list 1220.

In the example illustrated in FIG. 12, a broadcast image 210 has an app ID "1000", a time table 232 has an app ID "1001", a memo 226 has an app ID "1003", and a calendar 225 has an app ID "2012". Furthermore, the clock 221 has an app ID "1024", the weather forecast 222 has an app ID "1021", the timer 223 has an app ID "1042", and the photograph 224 has an app ID "2022".

It should be noted that the expression "app image 220 has an app ID" means that the app image 220 has an identifier (app ID) corresponding to the app image 220. In other words, when the memo 226 has the app ID "1003", the app ID of a memo app corresponding to the memo 226 is "1003". As described above, these app IDs are used to uniquely identify a plurality of apps arranged on the home screen 200.

On the home screen 200, it is possible to designate a position of each of apps on the home screen 200. In FIG. 12, the home screen 200 is divided to vertical 4 grids×horizontal 4 grids (refer to FIG. 4). An area occupying 3×3 grids counted from the upper left of the home screen 200 is used for displaying the broadcast image 210. An area occupying 1×1 grid counted from the upper right of the home screen 200 is used for displaying the clock 221.

The information of these positions can be expressed, for example, by number sequences such as the display position information 1230 in FIG. 12. The numbers in the sequence of the display position information 1230 indicate an order of app IDs in the application list 1220.

For example, "0" in the display position information 1230 indicates the 0th app ID "1000" in the application list 1220, and "4" in the display position information 1230 indicates the fourth app ID "1024" in the application list 1220.

Furthermore, in the display position information 1230, four sequences each having four elements are vertically arranged. When the home screen 200 is divided to 4×4 grids, the first sequence for expressing allocation for one or more apps (app images 220) indicates positions of four grids arranged from left to right in the top row of the grids of the home screen 200.

The second sequence for expressing allocation for one or more apps (app images 220) indicates positions of four grids arranged from left to right in the second row from the top.

In other words, the number sequences express that the app "0", namely, the broadcast image 210, is to be allocated on an area occupying 3×3 grids counted from the upper left, and that the app "4", namely, the clock 221, is to be allocated on an area occupying 1×1 grid counted from the upper right.

As described above, the broadcast image output device 110 completes the home screen download processing. Then, the broadcast image output device 110 proceeds to the app download processing. It should be noted that the app download processing may be automatically performed after the home screen download processing, or may be performed at a timing requested by the user (for example, when a request for execution of a certain app is actually issued).

[1-4-2. App Download Processing]

Figure 13:
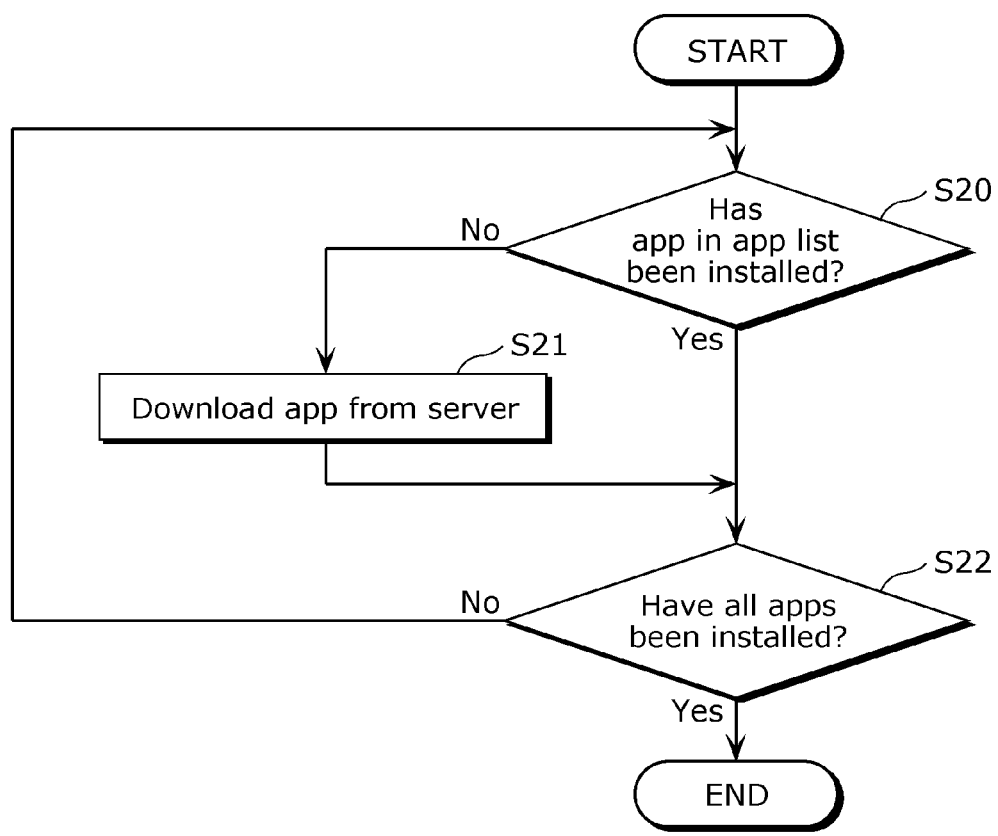
FIG. 13 is a flowchart of a basic operation of application (app) download processing according to the embodiment.

FIG. 13 is a flowchart of a basic operation of the app download processing according to the present embodiment.

The app download processing is performed by the control unit 115 of the broadcast image output device 110 in the following manner.

After storing the screen information of the new home screen to the memory unit 116, the control unit 115 examines whether or not each of apps in the stored application list 1220 of the new home screen has already been installed on the broadcast image output device 110 (S20). For example, the examination is first made for the first app indicated in the application list 1220.

If the app has not yet been installed (No at S20), then the control unit 115 downloads the app from the download server 300 via the communication unit 113 (S21). As a result, the app is stored in the memory unit 116. In other words, the app is installed on the broadcast image output device 110.

On the other hand, if the app has already been installed (Yes at S20) and there is another app next to the app in the application list 1220 (for example, the second app indicated in the application list 1220) (No at S22), then the control unit 115 proceeds to the step for examination of the next app (S20).

If all of the apps indicated in the application list 1220 have already been installed on the broadcast image output device 110 (Yes at S22), the control unit 115 completes the app download processing.

As described above, in the app download processing, the control unit 115 downloads only apps which are not stored in the memory unit 116 among one or more apps corresponding to respective app images 220 arranged on the new home screen.

For example, if the new home screen has seven apps and five of the seven apps have already been installed (stored in the memory unit 116), only remaining two apps are downloaded to the broadcast image output device 110.

In other words, in the download processing for the new home screen, only apps, which can be executed from the new home screen but have not yet been stored in the memory unit 116, are downloaded from the download server 300. Therefore, the download processing for the new home screen can be performed efficiently.

Here, in order to examine whether or not a target app has already been installed, it is possible, for example, to examine whether or not the memory unit 116 holds a directory indicating an app ID of the target app. The method of downloading an app from the download server 300 can be achieved by various conventional techniques. Therefore, the details of the method are not described.

It is also possible that, if a target app in the new home screen (app arranged on the new home screen) has not yet been actually installed on the broadcast image output device 110, issuing of a request for executing the app may trigger downloading of the app. In other words, the app download processing is not performed together with the home screen download processing, but may be performed when a target app arranged on the new home screen is actually to be used.

Figure 14:
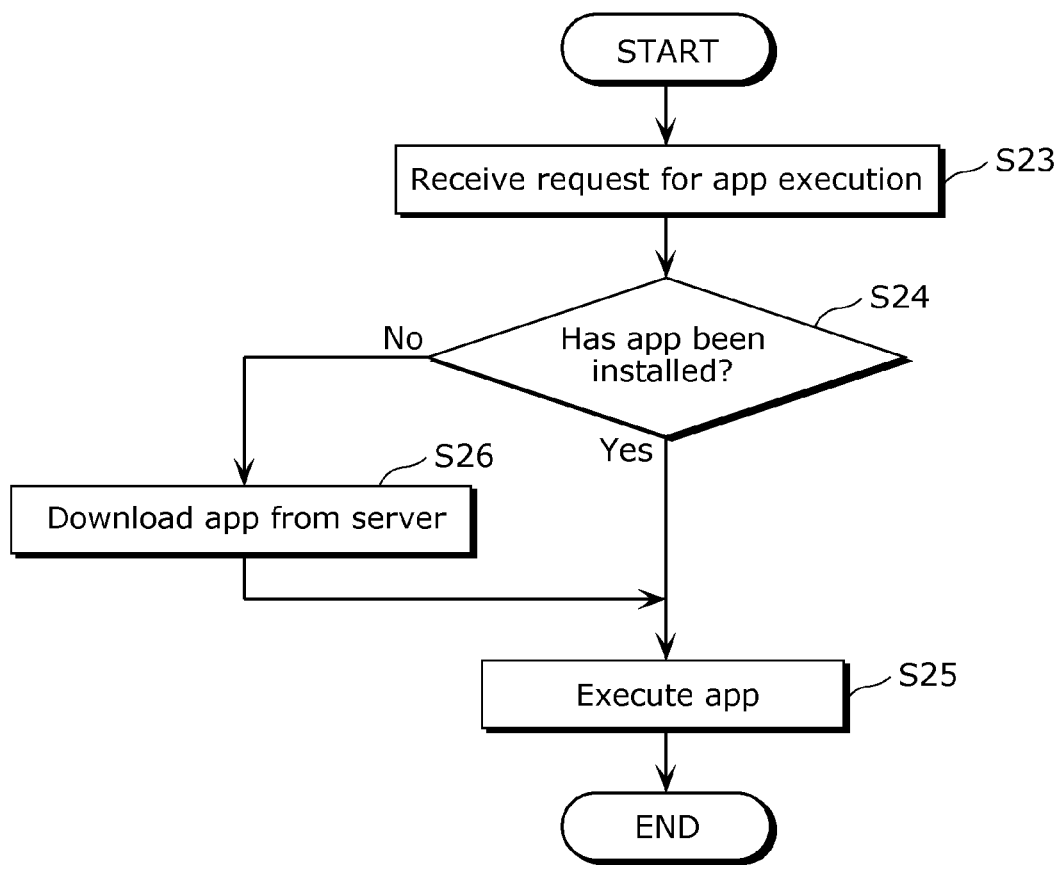
FIG. 14 is a flowchart of another example of app download processing according to the embodiment.

This processing is described in more detail with reference to FIG. 14. FIG. 14 is a flowchart of another example of the app download processing according to the present embodiment.

If the user requests execution of a target app by operating the remote control 170 or the like and then the user's request is received on the new home screen downloaded on the broadcast image output device 100 (S23), the control unit 115 examines whether or not the app has already been installed on the memory unit 116 of the broadcast image output device 110 (S24). If the app has already been installed (Yes at S24), then the app stored in the memory unit 116 is executed (S25).

On the other hand, if the app has not yet been installed (No at S24), then the app is downloaded (S26). More specifically, the app is downloaded from the download server 300 to the broadcast image output device 110. Then, the control unit 115 executes the downloaded app (S25).

As described above, it is possible to reduce a time required from starting of download processing for a new home screen to displaying of the new home screen, if an app is downloaded when the app is actually to be executed, not when the new home screen is downloaded (when screen information of the new home screen is downloaded).

Furthermore, if all of the apps to be arranged on the new home screen have been downloaded and one or more apps among the downloaded apps are not used by the user, the memory area of the memory unit 116 is wasted. In order to prevent this, as described above, the control unit 115 downloads an app when the app becomes necessary (when the app is to be executed). As a result, the use efficiency of the memory unit 116 is improved, for example.

Moreover, if, for example, different app IDs are assigned to respective different versions of the same app, the broadcast image output device 110 upgrades the apps stored in the memory unit 116 according to the flow of FIG. 13 or 14. For example, if a part of an app ID indicates a version number, each app ID can express a version difference of the same app.

[1-5. Automatic App Download Processing]

If the broadcast image output device 110 is turned OFF during download processing for a new home screen (including a situation where the user does not intend, such as power outage), the download processing is stopped. However, the broadcast image output device 110 can automatically resume the stopped download processing when the broadcast image output device 110 is turned ON again.

Furthermore, the download server 300 can cause the broadcast image output device 110 (television 100) to automatically download, for example, a recommending app when the broadcast image output device 110 is turned ON. The following describes the situation where download processing is automatically performed after turning ON the broadcast image output device 110 with reference to FIGS. 15 to 17.

Figure 15:
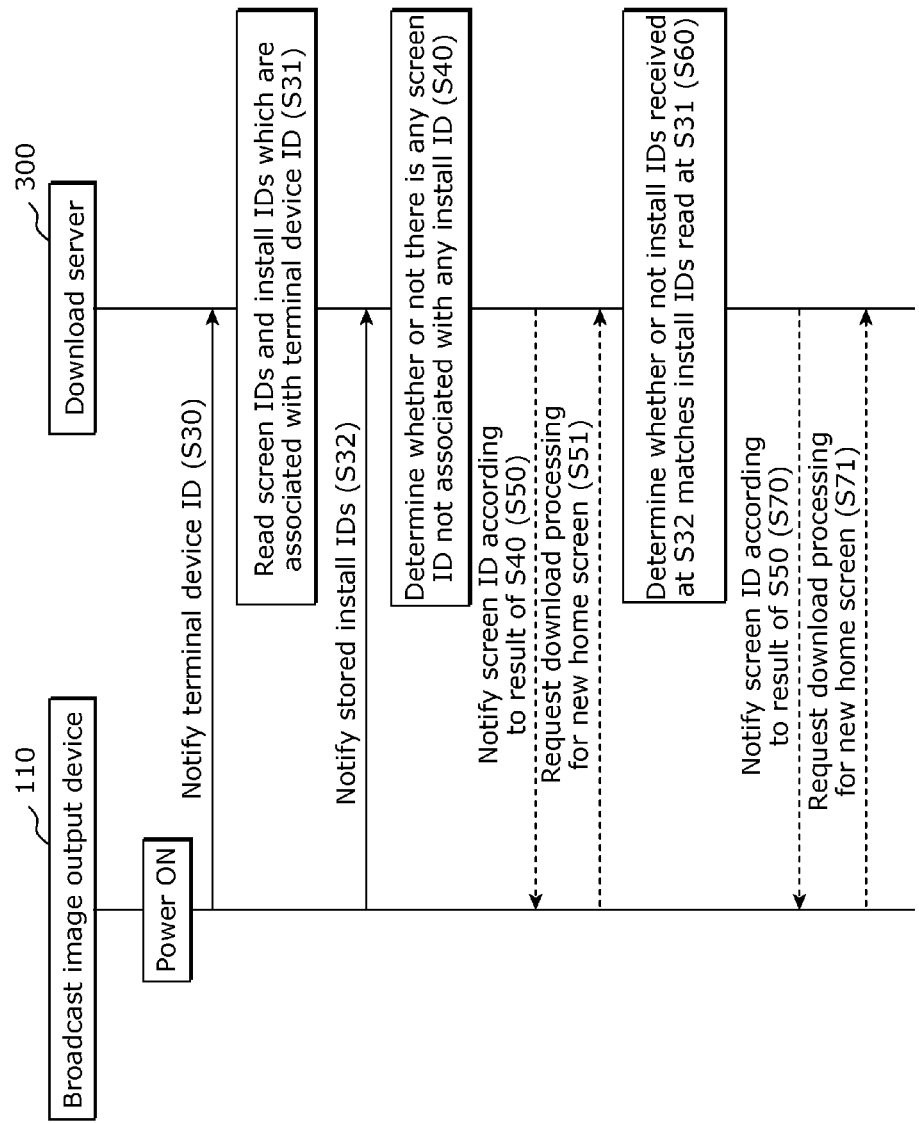
FIG. 15 illustrates an example of a communication sequence in automatic download processing performed by the broadcast image output device according to the embodiment.

FIG. 15 illustrates an example of a communication sequence in automatic download processing performed by the broadcast image output device 110 according to the present embodiment.

Figures 16, 17:
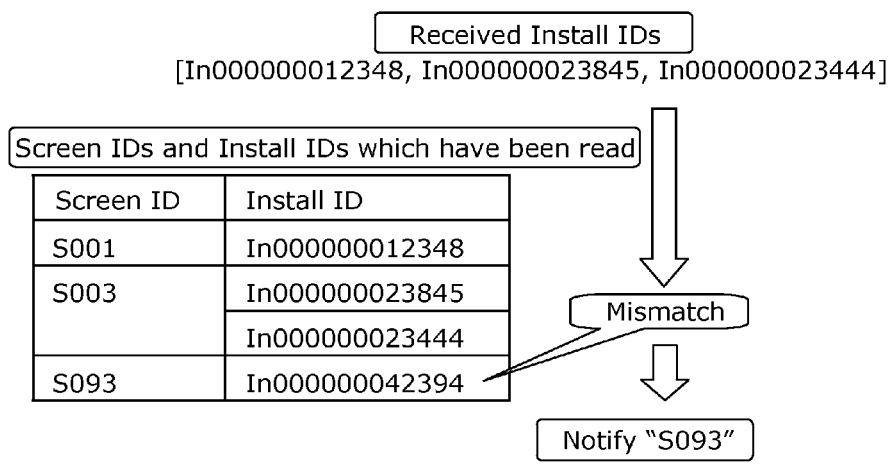
FIG. 16 illustrates another example of a data structure of the management table according to the embodiment.
FIG. 17 explains install ID comparison performed by the download server according to the embodiment.

FIG. 16 illustrates another example of a data structure of the management table 350 according to the present embodiment.

FIG. 17 explains install ID comparison performed by the download server 300 according to the present embodiment.

It should be noted that the processing performed by the broadcast image output device 110 in the communication sequence illustrated in FIG. 15 is, for example, processing in the background, and does not require user's operation using the remote control or the like.

As illustrated in FIG. 15, after the broadcast image output device 110 is turned ON, the broadcast image output device 110 notifies its terminal device ID to the download server 300 (S30). The download server 300 reads, from the management table 350, a screen ID and an install ID which are associated with the terminal device ID received at S30 (S31).

After notifying the terminal device ID, the broadcast image output device 110 notifies the download server 300 of installs ID of home screens 200 that have already been downloaded on the broadcast image output device 110 (S32).

The download server 300 first determines whether or not there is any screen ID not associated with any install ID among one or more screen IDs read at S31 (in other words, whether or not there is a screen ID for which any install ID has not yet been issued) (S40).

If there is a screen ID for which any install ID is not issued, this means that a home screen 200 identified by the screen ID has not yet been downloaded on the broadcast image output device 110.

Here, the screen ID has been registered not at a request from the broadcast image output device 110 (S13 in FIG. 10). The screen ID has been registered by the download server 300 into the management table 350, for example, as an ID indicating a new home screen which the download server 300 causes the broadcast image output device 110 to download.

Such a new home screen may be a home screen 200 including one or more apps which are newly released, or a home screen 200 expected as suitable for the user of the broadcast image output device 110 based on the management table 350 (download history).

For example, in the management table 350 seen in FIG. 16, a screen ID "S872" associated with a terminal device ID "D123" is not associated with any install ID. In other words, "S872" is a screen ID for which an install ID has not yet been issued.

In this case, the download server 300 issues, to a broadcast image output device 110 having the terminal device ID "D123", a download processing request including the screen ID "S872" for requesting download processing regarding the screen ID "S872" (S50). In receiving the request, the broadcast image output device 110 issues a download processing request including the screen ID "S872" for requesting screen information of a home screen associated with the screen ID "S872" (S51). In other words, the processing of the broadcast image output device 110 proceeds to S13 in FIG. 10.

The broadcast image output device 110 thereby downloads and stores screen information associated with the screen ID "S872", and downloads one or more apps, if necessary (refer to FIG. 13 or FIG. 14). As a result, the control unit 115 of the broadcast image output device 110 can cause the output unit 114 to output a new home screen having the screen ID "S872" as an initial screen.

Furthermore, the download server 300 compares the install IDs notified from the broadcast image output device 110 at 32 to the install IDs read at S31 (S60). As a result of the comparison, if there is a notified install ID which does not match any readout install ID, there is a possibility that download processing for a home screen 200 identified by the notified install ID has been interrupted.

For example, there is a situation where, at S31 performed by the download server 300, four install IDs associated with the broadcast image output device 110 having the terminal device ID "D123" are read from the management table 350 as seen in FIG. 17.

The readout of the four install IDs of four new home screens shows that the download server 300 has already completed at least issuing of the four install IDs and storing of the four install IDs to the management table 350 (S15 in FIG. 10).

In this situation, for example, at S32, the broadcast image output device 110 having the terminal device ID "D123" notifies three install IDs seen in FIG. 17 to the download server 300. The notification of the three install IDs shows that the memory unit 116 of the broadcast image output device 110 currently holds respective pieces of screen information of three new home screens associated with the respective three install IDs. In other words, for each of the three new home screens, at least the home screen download processing in FIG. 10 has been completed.

In short, the comparison of the readout four install IDs to the notified (received) three install IDs shows that a readout install ID "In000000042394" does not match any of the notified install IDs and is therefore considered as not stored in the memory unit 116 of the broadcast image output device 110. In other words, it can be considered that download processing for a home screen 200 having a screen ID "S093" associated with the mismatch readout install ID has been interrupted after starting the download processing.

Therefore, the download server 300 identifies the screen ID "S093" associated with the install ID "In000000042394" regarding the broadcast image output device 110 having the terminal device ID "D123". The download server 300 further issues a download processing request including the identified screen ID "S093" for requesting download processing regarding the identified screen ID "S093" (re-download processing request) (S70).

The broadcast image output device 110 receiving the re-download processing request issues a download processing request including the received screen ID "S093" for requesting screen information of a new home screen associated with the screen ID "S093" (S71). In other words, the broadcast image output device 110 proceeds to S13 of FIG. 10, and resumes the interrupted download processing for the screen ID "S093". More specifically, the interrupted download processing is performed again.

As a result, the broadcast image output device 110 downloads and stores screen information associated with the screen ID "S093", and downloads one or more apps, if necessary (refer to FIG. 13 or FIG. 14). As a result, the control unit 115 of the broadcast image output device 110 can cause the output unit 114 to output a new home screen having the screen ID "S093" as an initial screen.

[1-6. Effects Etc.]

As described above, in the present embodiment, the broadcast image output device 110 includes: the reception unit 112 that receives broadcast; the communication unit 113 that communicates with the download server 300; the output unit 114 that outputs each of a plurality of home screens; the memory unit 116 that holds a plurality of home screens 200; and the control unit 115 that selects one of the home screens 200 and causes the output unit 114 to output the selected home screen 200 as an initial screen after the broadcast image output device 110 is turned ON.

The control unit 115 performs download processing for a new home screen via the communication unit. Furthermore, the control unit 115 causes the memory unit 116 to hold home-related information of the new home screen which is downloaded from the download server 300 in the download processing to be used to generate at least part of the new home screen. The control unit 115 further causes the output unit 114 to output the new home screen generated based on the home-related information as an initial screen.

It should be noted that the home screen 200 is a screen on which (a) a first image (broadcast image 210) that is a broadcast image relating to a broadcast or (b) a second image (app image 220) that is not a broadcast image is capable of arranged on each section of the display area. In the present embodiment, one of home screens 200 is outputted from the output unit 114 as an initial screen on which user's operation can be received, and then displayed on the display 150 of the television 100.

With the above structure, the broadcast image output device 110 according to the present embodiment is capable of efficiently downloading various kinds of home screens 200 stored in the download server 300 according to a request from the user or a state of the broadcast image output device 110. More specifically, the broadcast image output device 110 is capable of obtaining a target home screen 200 to be downloaded in units indicated in the home-related information. In other words, the broadcast image output device 110 is capable of efficiently increasing the number of stored home screens 200 available as an initial screen.

Furthermore, in the present embodiment, the control unit 115 of the broadcast image output device 110 performs, in the download processing, the first download processing (home screen download processing) for downloading screen information of a new home screen as home-related information. This screen information includes at least one of: a background image of the new home screen; one or more app IDs of apps corresponding to respective app images 220 to be arranged on the new home screen; and display position information of the app images 220.

With this structure, the broadcast image output device 110 is capable of obtaining, by the download processing, the screen information that is information mainly relating to displaying of a new home screen. For example, since the screen information includes a plurality of app IDs corresponding to a corresponding new home screen, it is possible to generate and output the new home screen on which apps corresponding to the app IDs are arranged. In other words, it is possible to efficiently perform processing to download and display the new home screen.

Furthermore, in the present embodiment, the control unit 115 of the broadcast image output device 110 performs the second download processing (app download processing) as download processing, when the new home screen 200 has one or more app images 220.

By the app download processing, one or more apps which are home-related information and correspond to respective app images 220 are downloaded.

With the above structure, one or more apps are downloaded to the broadcast image output device 110, when the apps are to be arranged on the home screen. As a result, downloading for the new home screen is efficiently performed.

Furthermore, in the present embodiment, the control unit 115 of the broadcast image output device 110 downloads, in the app download processing, an app which is not stored in the memory unit 116 among one or more apps corresponding to the respective app images 220.

With this structure, it is possible to download only app not held in the broadcast image output device 110. As a result, downloading for the new home screen is more efficiently performed.

Moreover, in the present embodiment, the control unit 115 of the broadcast image output device 110 performs app download processing, when the control unit 115 causes the output unit 114 to output a new home screen as an initial screen after performing the home screen download processing and then receives a request for execution of an app in the new home screen.

With the structure, an app is downloaded when the app is actually to be executed. Therefore, it is possible to reduce a time required from staring of the download processing to displaying (an apparent downloading period). Furthermore, only app to be actually executed is stored in the memory unit 116. Therefore, use efficiency of the memory unit 116 is also improved.

According to the present embodiment, in the download processing, the control unit 115 of the broadcast image output device 110 downloads an install ID associated with a downloaded new home screen, and causes the memory unit 116 to hold the install ID in association with screen information. The control unit 115 transmits the install ID stored in the memory unit 116 to the download server 300 via the communication unit 113.

With the above structure, when the screen information is stored into the memory unit 116, the install ID is also stored into the memory unit 116. In other words, the broadcast image output device 110 can notify the download server 300 with completion of downloading of the screen information, by notifying the install ID stored in the memory unit 116 to the download server 300.

It is therefore possible to cause the download server 300 to appropriately obtain information such as kinds and the number of the home screens 200 downloaded on the broadcast image output device 110. Therefore, for example, in the case where download processing is interrupted, the broadcast image output device 110 can, for example, resume the download processing at a request from the download server 300.

Moreover, the download server 300 according to the present embodiment includes: the communication unit 313 capable of communicating with the broadcast image output device 110; the memory unit 316 that holds home-related information (screen information, apps, and the like) to be used to generate at least part of a home screen 200; and the control unit 315 that transmits the home-related information read from the memory unit 316 to the broadcast image output device 110 via the communication unit 313.

With the above structure, the download server 300 can cause the broadcast image output device 110 to obtain a home screen 200 available as an initial screen in units of home-related information. In other words, it is possible to cause the broadcast image output device 110 to efficiently download an initial screen (home screen 200).

Furthermore, according to the present embodiment, if home-related information (screen information) of a target home screen 200 is to be transmitted, the control unit 315 of the download server 300 transmits an install ID associated with the target home screen 200 to the broadcast image output device 110 via the communication unit 313. Furthermore, if the communication unit 313 transmits the install ID and then receives the a terminal device ID for identifying the broadcast image output device 110 but does not receive the install ID from the broadcast image output device 110, the control unit 315 transmits a screen ID for identifying the target home screen 200 to the broadcast image output device 110 via the communication unit 313.

With this structure, since the download server 300 does not receive from the broadcast image output device 110 the install ID that has transmitted to the broadcast image output device 110, the download server 300 determines that download processing for the home screen 200 associated with the install ID has not yet been completed. Therefore, the download server 300 can request the broadcast image output device 110 to resume the download processing for the home screen 200 (re-download processing request).

In this case, the broadcast image output device 110 does not need to check whether or not download processing for adding an initial screen (home screen 200) has successfully been completed. The broadcast image output device 110 can complete the download processing by responding to a request from the download server 300.

Furthermore, according to the present embodiment, the control unit 315 of the download server 300 causes the memory unit 316 to hold the management table 350 for managing the broadcast image output device 110. The management table 350 holds, in association with one another, (i) a terminal device ID of the broadcast image output device 110, (ii) screen IDs of respective home screens 200 associated with pieces of home-related information transmitted or to be transmitted to the broadcast image output device 110, and (iii) install IDs issued from the control unit 315 when the pieces of home-related information are transmitted. If there is a screen ID not associated with any install ID in the management table 350, the control unit 315 transmits the screen ID to the broadcast image output device 110 via the communication unit 313.

With the above structure, the download server 300 can notify the broadcast image output device 110 with a screen ID of a target home screen 200 which the broadcast image output device 110 should download, such as a screen ID of a home screen 200 newly added to the memory unit 316. As a result, it is possible to cause the broadcast image output device 110 to download the home screen 200.

Therefore, the download server 300 causes the broadcast image output device 110 to download, for example, a home screen 200 which an administrator of the download server 300 wishes to cause the broadcast image output device 110 to download, or a home screen 200 selected according to a download history or the like of the broadcast image output device 110.

(Variations of Embodiment)

As above, the embodiment has been described as an example of the present disclosure. However, the present disclosure is not limited to the previously-described embodiment. Modification, replacement, addition, elimination, and the like of the structural elements can be made to the previously-described embodiment in the appropriately manner. Furthermore, the structural elements described in the previously-described embodiment can be combined to provide new variations of the embodiment.

The following describes variations from the previously-described embodiments.

According to the previously-described embodiment, the download processing performed by the broadcast image output device 110 includes: the home screen download processing for downloading screen information; and app download processing for downloading apps. However, the download processing is not necessarily divided specifically to the home screen download processing and the app download processing.

For example, in the download processing, the control unit 115 of the broadcast image output device 110 may download, from the download server 300, home-related information that includes (a) display position information of one or more app images 220 to be arranged on a new home screen and (b) apps corresponding to the respective app images 220.

As described above, the broadcast image output device 110 may sequentially download (a) the display position information of one or more app images 220 to be arranged on the new home screen and (b) one or more apps corresponding to the respective app images 220. In this manner, it is also possible to add the new home screen to the memory unit 116.

Although it has been described in the previously-described embodiment that the screen information includes various pieces of information as seen in FIG. 12, the screen information may include only one kind of information. For example, the screen information may include the background image 1202 only. In this case, the broadcast image output device 110 can output, as an initial screen, for example, a home screen 200 on which only the background image 1202 is displayed on the entire display area.

Furthermore, for example, the screen information may include the application list 1220 only. In this case, the broadcast image output device 110 can output, as an initial screen, for example, a home screen 200 on which a plurality of apps indicated in the application list 1220 are arranged according to a predetermined rule.

Although it has been described in the previously-described embodiment that the broadcast image output device 110 adds apps to the memory unit 116 (refer to FIGS. 13 and 14), the control unit 115 of the broadcast image output device 110 may delete, from the memory unit 116, for example, an app having no possibility of being used.

For example, the control unit 115 compares app IDs indicated in all the application lists 1220 stored in the memory unit 116 to app IDs of all the apps stored in the memory unit 116. The comparison specifies an app which is stored in the memory unit 116 but not indicated in any of the application lists 1220. In other words, one or more apps which are not necessary on any home screen 200 are specified. Therefore, the control unit 115 deletes the specified apps. As a result, it is possible to improve use efficiently of the memory unit 116, for example.

According to the previously-described embodiment, each of the lifestyle home 200a and the TV home 200b (refer to FIG. 5) which are examples of the home screen 200 displays a broadcast image 210. However, such a home screen 200 does not necessarily display the broadcast image 210. The output unit 114 may output a home screen 200 displaying one or more app images 220 only.

Furthermore, the entire display area of the home screen 200 is not necessarily occupied with the broadcast image 210 and the app images 220. For example, it is possible to remove at least one of the seven app images 220 from the lifestyle home 200a (see (a) in FIG. 5). In this case, a vacant area on which an app image 220 is not arranged may display, for example, the background image 1202 set in the lifestyle home 200a.

The home screen 200 according to the previously-described embodiment may be, for example, vertically and horizontally scrolled. As a result, it is possible to increase the total number of the broadcast image 210 and the app images 220 arranged on a single home screen 200.

Prior to output of a home screen 200 as an initial screen after turning ON the broadcast image output device 110, the broadcast image output device 110 according to the previously-described embodiment may output an image other than the home screen 200, such as a logo of a manufacturer of the television 100.

As described above, the embodiment and its variations have been described as examples of the present disclosure. The appended drawings and detailed description are given for the embodiment and its variations.

Therefore, the structural elements illustrated in the appended drawings and described in the detailed description may include not only structural elements necessary for solving the technical problems, but also structural elements not necessary for solving the technical problems but necessary for explaining the examples of the present disclosure. Therefore, such unnecessary structural elements illustrated in the appended drawings or described in the detailed description should not be directly considered as necessary in the present disclosure.

Furthermore, since the above-described embodiment and its variations are examples of the present disclosure, various modification, replacement, addition, elimination, and the like of the structural elements can be made to the embodiment and its variations within a scope or an equivalent meaning of the claims.

INDUSTRIAL APPLICABILITY

The present disclosure is applicable to broadcast image output devices capable of efficiently performing processing for presenting an initial screen suitable for a user and also customizing the initial screen. For example, the present disclosure is applicable to electronic devices, such as a television, a personal computer (PC), a server, a mobile phone, a video camera, and a video recorder. The present disclosure is also applicable to recording mediums, such as a Compact Disc (CD) and a Digital Versatile Disc (DVD), on which a computer program that can execute the above-described functions is recorded.

The invention claimed is:

1. A broadcast image output device capable of communicating with a download server, the broadcast image output device comprising:
    a reception unit configured to receive a broadcast;
    a communication unit configured to communicate with the download server;
    an output unit configured to output each of home screens each having a display area divided to sections on each of which one of a first image and at least one second image is capable of being arranged, the first image being a broadcast image relating to the broadcast, and the at least one second image being other than the broadcast image;
    a memory unit configured to hold the home screens; and
    a control unit configured to select one of the home screens and cause the output unit to output the selected one of the home screens as an initial screen to be displayed after the broadcast image output device is turned ON,
    wherein the control unit is configured to (a) perform, via the communication unit, download processing for a new home screen that is a home screen not yet held in the memory unit, (b) cause the memory unit to hold home-related information downloaded from the download server in the download processing to be used to generate at least part of the new home screen, and (c) cause the output unit to output, as the initial screen, the new home screen generated based on the home-related information,
    when the new home screen has the at least one second image, the control unit is configured to, in the download processing, check whether at least one application program corresponding to the at least one second image is held in the memory unit, and download at least one application program corresponding to the at least one second image confirmed to not be held in the memory unit, and
    the control unit is further configured to:
    download, in the download processing, an install identifier associated with the new home screen, and cause the memory unit to hold the install identifier in association with the home-related information; and
    transmit the install identifier held in the memory unit to the download server via the communication unit to notify the download server of completion of downloading of the home-related information.

2. The broadcast image output device according to claim 1,
    wherein the control unit is configured to perform first download processing in the download processing to download screen information of the new home screen, the screen information being included in the home-related information, and
    the screen information includes at least one of: a background image of the new home screen; an identifier of each of the at least one application program corresponding to the at least one second image to be arranged on the new home screen; and display position information of the at least one second image.

3. The broadcast image output device according to claim 2,
    wherein the at least one application program corresponding to the at least one second image is included in the home-related information.

4. The broadcast image output device according to claim 3,
wherein the control unit is configured to download the at least one application program corresponding to the at least one second image when (i) the control unit causes the output unit to output the new home screen as the initial screen after the first download processing and (ii) the at least one application program corresponding to the new home screen is requested to be executed.

5. The broadcast image output device according to claim 1,
wherein the control unit is configured to download display position information and the at least one application program corresponding to the at least one second image from the download server in the download processing, the display position information and the at least one application program being included in the home-related information, the display position information indicating a display position of each of the at least one second image to be arranged on the new home screen.

6. A download server capable of communicating with a broadcast image output device, the download server comprising:
a communication unit configured to communicate with the broadcast image output device;
a memory unit configured to hold home-related information to be used to generate at least part of a home screen having a display area divided to sections on each of which one of a first image and at least one second image is capable of being arranged, the first image being a broadcast image relating to a broadcast, and the at least one second image being other than the broadcast image; and
a control unit configured to transmit the home-related information read from the memory unit to the broadcast image output device via the communication unit,
wherein the control unit is configured:
to, when the home-related information is to be transmitted, issue an install identifier that is associated with the home screen and is to be transmitted from the broadcast image output device to notify the download server of completion of downloading of the home-related information, and transmit the issued install identifier to the broadcast image output device via the communication unit; and
to transmit a home identifier for identifying the home screen to the broadcast image output device via the communication unit, when the communication unit receives a terminal device identifier for identifying the broadcast image output device and does not receive the install identifier after the transmission of the install identifier, to request the broadcast image output device to re-download the home-related information of the home screen.

7. A download server capable of communicating with a broadcast image output device, the download server comprising:
a communication unit configured to communicate with the broadcast image output device;
a memory unit configured to hold home-related information to be used to generate at least part of a home screen having a display area divided to sections on each of which one of a first image and at least one second image is capable of being arranged, the first image being a broadcast image relating to a broadcast, and the at least one second image being other than the broadcast image; and
a control unit configured to transmit the home-related information read from the memory unit to the broadcast image output device via the communication unit,
wherein the control unit is configured to cause the memory unit to hold a management table for managing the broadcast image output device,
the management table holds a terminal device identifier, one or more home identifiers, and one or more install identifiers in association with one another, the terminal device identifier identifying the broadcast image output device, the one or more home identifiers each identifying a corresponding one of home screens including the home screen corresponding to the home-related information transmitted or to be transmitted to the broadcast image output device, and the one or more install identifiers each being issued by the control unit when a corresponding one of pieces of home-related information including the home-related information is downloaded, and
the control unit is further configured, when a home identifier among the one or more home identifiers is not associated with any of the one or more install identifiers in the management table, to transmit the home identifier to the broadcast image output device via the communication unit, to request the broadcast image output device to download the home-related information of the home screen.

8. A method of controlling a broadcast image output device capable of communicating with a download server,
the broadcast image output device including a memory unit holding home screens each having a display area divided to sections on each of which one of a broadcast image and at least one image is capable of being arranged, the broadcast image relating to a broadcast received by the broadcast image output device, and the at least one image being other than the broadcast image, and
the method comprising:
selecting one of the home screens, and causing an output unit included in the broadcast image output device to output the one of the home screens as an initial screen to be displayed after the broadcast image output device is turned ON;
communicating with the download server to perform download processing for a new home screen; and
causing the memory unit to hold home-related information downloaded from the download server in the download processing to be used to generate at least part of the new home screen,
wherein, in the causing of the output unit to output the one of the home screens, the new home screen generated based on the home-related information is outputted as the initial screen by the output unit,
when the new home screen has the at least one second image, the download processing includes checking whether at least one application program corresponding to the at least one second image is held in the memory unit, and downloading at least one application program corresponding to the at least one second image confirmed to not be held in the memory unit,
the download processing includes downloading an install identifier associated with the new home screen,
the memory unit is caused to hold the install identifier in association with the home-related information, and the install identifier held in the memory unit is transmitted to the download server to notify the download server of completion of downloading of the home-related information.

9. A method of controlling a download server capable of communicating with a broadcast image output device, the method comprising:

causing a memory unit included in the download server to hold home-related information to be used to generate at least part of a home screen having a display area divided to sections on each of which one of a first image and at least one second image is capable of being arranged, the first image being a broadcast image relating to a broadcast, and the at least one second image being other than the broadcast image;

reading the home-related information from the memory unit, and transmitting the home-related information to the broadcast image output device;

issuing, when the home-related information is to be transmitted, an install identifier that is associated with the home screen and is to be transmitted from the broadcast image output device to notify the download server of completion of downloading of the home-related information;

transmitting the issued install identifier to the broadcast image output device; and transmitting a home identifier for identifying the home screen to the broadcast image output device, when the download server receives a terminal device identifier for identifying the broadcast image output device and does not receive the install identifier after the transmission of the install identifier, to request the broadcast image output device to re-download the home-related information of the home screen.

* * * * *